United States Patent [19]

Smarook

[11] 3,919,382
[45] Nov. 11, 1975

[54] EXPANDING PROCESS WITH NON-ALIGNED MOLDS

[75] Inventor: Walter H. Smarook, Somerville, N.J.

[73] Assignee: Union Carbide Corporation, New York, N.Y.

[22] Filed: Dec. 26, 1973

[21] Appl. No.: 427,496

Related U.S. Application Data

[63] Continuation-in-part of Ser. No. 213,353, Dec. 29, 1971, abandoned.

[52] U.S. Cl. ............... 264/164; 264/261; 264/275; 264/346; 425/110; 425/812; 428/116; 428/119; 428/134; 428/137; 428/310
[51] Int. Cl.² ................... B29C 17/02; B32B 3/12
[58] Field of Search ....... 264/41, 291, 164, 47, 225, 264/261; 425/812, 110; 161/68, 69, 161

[56] References Cited
UNITED STATES PATENTS

| | | | |
|---|---|---|---|
| 2,502,304 | 3/1950 | Baker | 264/41 X |
| 2,962,409 | 11/1960 | Ludlow et al. | 264/261 X |
| 3,277,535 | 10/1966 | Rupert | 425/812 UX |
| 3,367,760 | 2/1968 | Bendig et al. | 264/291 X |

FOREIGN PATENTS OR APPLICATIONS

| | | | |
|---|---|---|---|
| 47-46782 | 11/1972 | Japan | 264/164 |
| 1,015,330 | 12/1965 | United Kingdom | 264/164 |

OTHER PUBLICATIONS

Billmeyer, Fred W., "Textbook of Polymer Science", New York, Interscience, c1962, pp. 198–204.
Sharpe, Louis H. and Harold Schonhorn, "Surface Energetics, Adhesion and Adhesion joints." In Contact angle, wettability, and adhesion: The Kendall Award Symposium Honoring William A. Zismane, sponsored by the Div. of Colloid and Surface Chemistry, 144th Meeting, Los Angeles, Calif., Apr. 2–3, 1963, Washington, D.C., American Chemical Society, pp. 189–201, (Advances in Chemistry Series 43).
Encyclopedia of Polymer Science and Technology, Vol. 1, Sections: "Theory of Adhesive Joints" and "Adhesive Compositions." New York, Interscience, c1964, pp. 477–485.
Encyclopedia of Polymer Science and Technology, Vol. 12, Section: "Sizing." New York, Interscience, c1970, pp. 585–588.
Billmeyer, Fred W., "Textbook of Polymer Science," New York, Interscience, c1962, pp. 198–207.
McLaren, A. D., "Adhesion of High Polymers to Cellulose. Influence of Structure, Polarity, and Tack Temperature." In Journal of Polymerscience, Vol. 3, No. 5 (1948), pp. 652–662.
McLaren, A. D., T.T. LI; Robert Rager; and H. Mark. "Adhesion IV. The Meaning of Tack Temperature." In Journal of Polymer Science, Vol. VII, No. 5, pp. 463–471 (1951).
ASTM Designations D907-64a, "Standard Definitions of terms relating to adhesives." Revised Aug. and Dec. 1964, pp. 274, 275, 280.
Birich, Frederick R., Edt., "Rheology Theory and Applications." Vol. 3, New York, Academic Press; 1960, pp. 167–176, 193, 481–485.

Primary Examiner—Philip Anderson
Attorney, Agent, or Firm—J. J. O'Connell

[57] ABSTRACT

A low pressure process for expanding the cross-section of a blank of thermoformable material between a pair of mold plates having perforation means therein, with the perforation means of one plate being selectively out of alignment, with the perforation means in a second plate, the expansion leading to the formation of one or more voids having a partial vacuum or reduced pressure within the cross-section of the blank, which comprises venting the voids during the expansion of the cross-section so as to equilibrate the level of pressure within the voids with the level of pressure without the blank so as to thereby regulate the uniformity and integrity of the resulting cross-sectional geometry of the expanded blank.

Products having an expanded cross-section are formed by such process.

22 Claims, 31 Drawing Figures

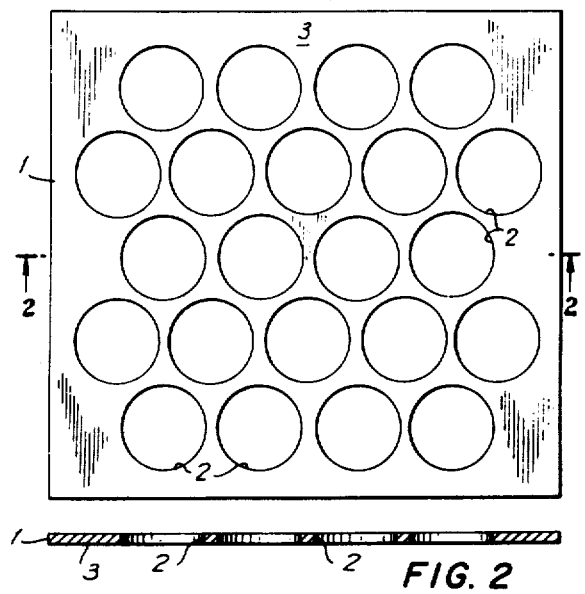
FIG. 1
FIG. 2
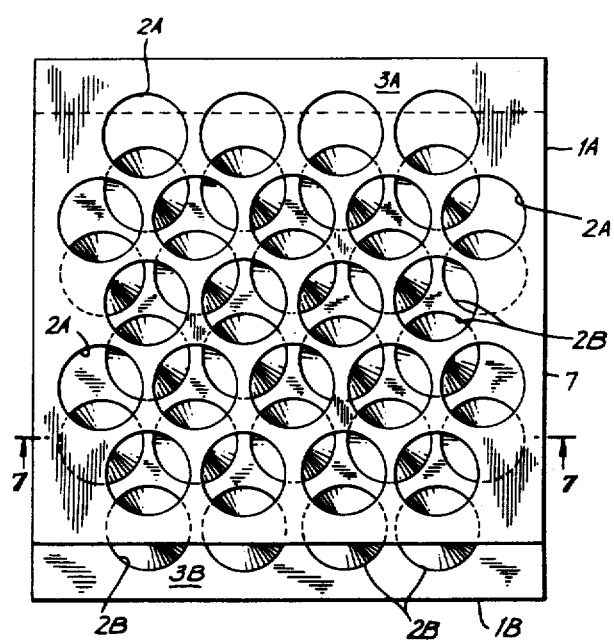
FIG. 3

EXPANDING PROCESS WITH NON-ALIGNED MOLDS

CROSS REFERENCES TO RELATED PATENT APPLICATIONS

This patent application is a continuation-in-part of patent application Ser. No. 213,353 filed Dec. 29, 1971, now abandoned.

BACKGROUND OF THE INVENTION

1. Field of the Invention

This invention relates to the art of forming or shaping end-use objects from thermoformable materials.

2. Description of the Prior Art

Structural panels are used for many applications. For certain applications it is desired that the panel have both rigidity and structural strength and that it also be relatively light-weight. In order to provide such panels various techniques have been devised for providing a core of rigid material having a relatively low density between skins of material which have relatively high densities. Most of these techniques require the use of specific adhesives for the purpose of bonding the low density cores to the high density skin laminae. This adhesive bonding technique has many drawbacks. One such drawback lies in the fact that it is not always possible to find an adhesive which is capable of readily bonding the two materials which one would desire to place in a laminate of this type. In order to provide such adhesives for such different laminae, it is necessary in some cases to devise relatively expensive adhesives. Considerable time and effort, moreover, is involved in utilizing some adhesives in the fabrication of the laminates. Many of these adhesives, for example, contain solvents. During the manufacture of the laminate with such adhesives it is necessary to provide a certain amount of time in which the solvent is allowed to evaporate from the adhesive before actual bonding occurs. This adhesive drying time tends to curtail the use of such solvent containing adhesives in applications which require the use of assembly line techniques in the fabrication of the laminates. It furthermore poses problems of solvent entrapment within the composite structure, which may lead to lower physical properties and odor problems.

Another drawback attendent upon the use of various types of adhesive relates to the use of adhesives which are of the curable type. These adhesives have a so-called "potlife" within which the adhesive must be used or it loses its utility. This potlife characteristic of the adhesive also tends to mitigate against the use of such adhesives for certain types of applications. The use of such adhesives also results in economic loss arising from the loss of adhesive which cannot be properly used during the potlife of such adhesives.

U.S. Pat. Nos. 2,502,304, 2,962,409 and 3,367,760 disclose processes for making laminates without the use of adhesives, but the laminates thus prepared have relatively little utility because of the relatively simple core geometries that can be produced using the process as disclosed in such patents.

SUMMARY OF THE INVENTION

Shaped articles made from thermoformable material, and expanded to provide a relatively lightweight core density and having a variety of configurations, and good physical properties are prepared in a relatively facile manner by expanding the cross-section of the thermoformable material in such a way between a pair of perforated non-aligned mold plates that one or more voids of reduced pressure are formed within the cross-section, and simultaneously venting the voids during the expansion of the cross-section of the material so as to equilibrate the pressure within the voids with the pressure without the thermoformable material so as to thereby regulate the uniformity and integrity of the resulting cross-sectional geometry in the expanded material.

An object of the present invention is to provide articles of commerce made from thermoformable materials and having an expanded cross-section.

A further object of the present invention is to provide rigid structural elements having a variety of lightweight core constructions or geometries.

A further object of the present invention is to provide a process wherein lightweight expanded articles may be readily formed form thermoformable materials, using assembly line techniques, and without the use of adhesives.

Another object of the present invention is to form, without the use of adhesives, expanded structures having regularly shaped voids therein of various geometric configurations and having enhanced rigidity properties provided by relatively large areas of discontinuous and/or continuous skin surface area as an integral feature of the expanded structures.

Another object of the present invention is to form expanded structures having perforations in the faces of the structures, which perforations have relatively thin lip members around the periphery thereof, and which lip members provide the perforations with an undercut structural feature.

Another object of the present invention is to provide, without the use of foaming or blowing agents, flexible or rigid expanded structures having relatively large amounts of void spaces therein.

DEFINITIONS

With respect to the herein provided description, examples and claims relating to the present invention the following definitions apply:

"Thermoformable" means that the thereby described material is a solid at 25°C. which can be reshaped or reformed above some higher temperature.

"Thermoplastic" means that the thereby described material is a solid at 25°C. which will soften or flow to a measurable degree above some higher temperature.

"Thermoset" means that the thereby described material is a solid at 25°C. which will not soften or flow, or cannot be reformed, at any higher temperature.

"Crystalline" means that the thereby described polymeric material exhibits a definite X-ray pattern for at least 50% of its polymeric structure when subjected to X-ray analysis.

"Amorphous" means that the thereby described polymeric material is devoid of a definite X-ray pattern for more than 50% of its polymeric structure when subjected to X-ray analysis.

"Ta" means that temperature at which a thermoplastic material exhibits hot tack adhesion.

"Tm" means, with respect to a crystalline polymer, the melting point of such polymer.

"Tg" means, with respect to an amorphous polymer, the temperature at which such polymer changes from a brittle to a rubbery condition. In a crystalline polymer it is the temperature at which the polymer becomes glassy.

"Plastic" means a natural or synthetic resin.

"Normally solid" means solid at 25°C.

"Wet" or "Wetting" means the relative ability of one material to achieve interfacial contact with another material.

"Hot tack adhesion" means the ability of one material to exhibit adhesion to a second material while the first material is in a molten state, above its Tm or Tg.

"Fusion point" means a temperature at which a material softens or melts.

"Cohesive Flow Property" means the property of a material in the molten state to be so readily distorted by external forces that the geometric cross-sectional area of such material will change substantially under such forces.

"Heat Distortion Point" means the temperature of a material as measured by ASTM D-648.

Most thermoformable materials have a Ta, i.e., a temperature at which they will exhibit hot tack adhesion to other materials. In the case of crystalline polymeric materials this Ta occurs about 5° to 10°C. above the Tm of such polymeric materials.

In the case of amorphous materials the Ta varies considerably, depending on the structure and molecular weight of the material. For the amorphous polymers, therefore, the Ta may be about 30° to 150°C. above the Tg of such polymers.

The Tm or Tg will also vary for a given polymeric backbone, depending on the molecular weight and density of the polymer.

The following is a listing of various polymeric materials which may be used in the present invention with a listing of their Tm or Tg, and their Ta, in °C. The Ta values reported here specifically relate to the Ta of the polymer when the polymer is being adhered to an aluminum substrate. The Ta value will be essentially the same for other substrates.

| Polymer | | Tg | Tm | Ta |
|---|---|---|---|---|
| 1. | polyethylene Density=0.96 M.I.=3–5 | — | 126 | 135–140 |
| 2. | polyethylene Density=0.94 M.I.-12–15 | — | 122 | 130–135 |
| 3. | polyethylene Density=0.924 M.I.=1.2 | — | 100–108 | 120 |
| 4. | polyvinyl chloride | >5 | — | 155 |
| 5. | Nylon-6 | 60 | 215–220 | 240 |
| 6. | Nylon-6,6 | 65 | 260 | 270 |
| 7. | Polycaprolactone | — | 58 | 60 |
| 8. | Polyurethane (linear polyester) | — | 130–170 | 160–180 |
| 9. | Polysulfone | 185 | — | 300 |
| 10. | polypropylene | —5 to 0 | 165–170 | 170 |
| 11. | polycarbonate | 150 | — | 225 |
| 12. | polymethylmethacrylate | 90 | — | 160 |
| 13. | polystyrene | 100 | — | 185 |
| 14. | polystyrene (impact grade) | 100 | — | 180 |
| 15. | polyacetal | −60 | 165 | 170 |
| 16. | 90/10 mol % copolymer of polymethacrylonitrile & styrene | 115 | — | 240 |
| 17. | 70/30 mol % copolymer of polyvinyl alcohol and polyvinyl acetate | 50–60 | — | 120–130 |
| 18. | 94.2/5.7 mol % copolymer of ethylene and ethyl acrylate | −20 | — | 110 |
| 19. | 91.8/8.2 mol % copolymer of ethylene and acrylic acid | 18 | — | 110 |
| 20. | 82/18 wt. % copolymer of ethylene and vinyl acetate M.I.=2.3 | −15 | — | 120 |
| 21. | styrene-butadiene copolymer | 90 | — | 190 |
| 22. | styrene-acrylonitrile copolymer | 100 | — | 190 |
| 23. | hydroxy propyl cellulose | 100 | — | 110 |
| 24. | (solution blend of) polystyrene and polyphenylene oxide | 115–120 | — | 235 |
| 25. | cellulose acetate | 120 | — | 170 |
| 26. | acrylonitrile-butadiene-styrene terpolymer | 100–104 | — | 180 |
| 27. | copolymer of ethylene and Na salt of methacrylic acid | — | 98 | 130 |

It has now been found that the cross-section of a thermoformable material may be readily expanded so as to provide a large variety of end use objects having a wide selection of expanded cross-sectional geometries by expanding the cross-section of a blank of such thermoformable materials between a pair of perforated non-aligned mold plates, or other perforation means, so as to cause the concurrent formation of one or more voids of reduced pressure within the expanding cross-section of such blank, and venting the voids during the expansion of such cross-section so as to equilibrate the pressure within the voids with the pressure outside the blank and thereby regulate the uniformity and integrity of the resulting cross-sectional geometry of the expanded blank. The expansion of the blank is conducted while the blank is heated so as to place the thermoformable material in a thermoformable state, i.e., the blank is heated to a temperature which is ≥ the fusion point of the thermoformable material. The thermoformable material is expanded between a pair of separable perforation means such as perforated mold plates, in which the perforations in one plate are not aligned with the perforations in the other plate and the plates are moved apart to effect the desired expansion of the blank of thermoformable material, while the blank is attached to the surface of such mold plates, in one way or another as disclosed below, during the expansion operation.

BRIEF DESCRIPTION OF THE DRAWINGS

FIG. 1 shows a top view and FIG. 2 shows a cross-sectional view of a perforated mold plate which may be used in the process of the present invention.

FIG. 3 shows, in perspective, a pair of the mold plates of FIGS. 1–2 in a non-aligned position.

Figure 4:
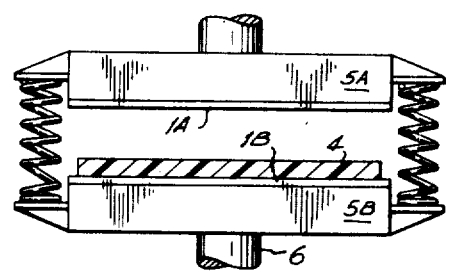
FIGS. 4 to 6 show a sequence of steps involved in increasing the cross-sectional area of a blank of thermoformable material according to one embodiment of the present invention using two non-aligned mold plates as shown in FIG. 3.

The preferred embodiment of the process of the present invention is based upon the property of various materials, and particularly thermoplastic polymeric materials, to exhibit hot-tack adhesion to practically all substrates at a temperature, $T_a$, which is usually above the $T_g$ of $T_m$ of the thermpolastic polymeric material. Thus, in a fused or molten state, the thermoplastic polymeric material will wet out practically all substrate surfaces and thereby impart adhesion thereto. In some cases this adhesion phenomena will be lost when the thermoplastic polymeric material cools below its $T_m$ or $T_g$.

Thus, if a blank of thermoplastic polymeric material is placed between two mold plates of a heated press so that the temperature of the mold plates is about $T_a$ or 5° to 10°C. above the $T_a$ of the polymeric material in the blank, and the mold plates mechanically separated apart, the adhesive forces of the polymeric material to the surfaces of the mold plates are greater than the cohesive flow properties of the polymeric material itself during the plate separation or expansion step. As a result, it is possible to mechanically move the mold plates a certain distance apart with the polymeric material bonded to the surfaces thereof without causing a rupture of the adhesion between such surfaces and the fused material.

Although the mass of the expanded fusible material does not change, the cross-sectional configuration of the fusible material is expanded in the direction of the two separate plates as a result of the adhesive force of attraction between the fused thermoformable material and the surfaces of the plates. The extent to which the cross-sectional area of the fused material can be so expanded is thus primarily determined by the strength of the adhesive bond between the fused material and the surfaces of the mold plates, and the extensibility, in the molten state, of the thermoplastic resin in the blank. The stronger is such adhesive bond, the greater is the amount of cohesive flow that can be induced in the molten resin without a rupture of the adhesive bond occuring. The strength of the bond will thus depend on the nature of the thermoplastic resin in the blank, the nature of the mold plate materials, the extent of the surface area of the mold plate which is in contact with the fused blank and the cohesive strength and flow properties of the polymeric plastic.

Thus, the use as mold surfaces, of materials which are more readily wet by the fused plastic blank, will allow for a wider separation of the mold surfaces with the fused plastic bonded thereto, than would the use of mold surfaces made from materials which are not as readily wet by the fused blank. Also, the use of the blank in the form of continuous sheet material will allow for the wetting with the blank of a larger amount of the surface area of the faces of the mold plates and thus allow for the attainment of greater adhesive forces between the fused blank and the mold plates.

As the mold plates are pulled apart with the heated thermoformable material bonded thereto, voids of reduced pressure are formed within the body of the expanding plastic. Thus, although the mass of plastic does not change, the volume of the expanding cross-section of the plastic does increase. The frequency of the occurrence of these voids, as well as their size and shape, i.e., the pattern of the voids, is largely determined by the pattern of the points or areas of contact which exist between the mold surfaces and the expanding plastic during the expansion process. In order to maintain the desireed pattern of the voids, it is necessary to vent the voids during the expansion step so as to equilibrate the pressure within the voids with the pressure without the expanding material.

The pattern of the points or areas of contact between the mold surfaces and the thermoplastic blank can be readily varied.

For the purposes of the present invention the means for providing such pattern of contact can be generally characterized as perforation means, and such perforation means are used to provide a pattern of individual and separate perforations at the interfaces between the top and botton surfaces of the blank and the blank contact surfaces of the two plates when the blank is inserted in the press between the two mold plates.

These perforations may be, at the plane of the interface between the mold plate and the blank, arcuate as in the shape of a circle or elipse, or angular, as in the shape of a triangle, rectangle, hexagon, or in the shape of a planar figure having both arcuate and angular sides, such as a hemisphere, or a section of a circle.

The perforations employed at each of the interfaces between the mold plates and the blank during the expansion of a blank are usually of the same size and shape, although they need not be. Different sized and-/or shaped perforations may be used at one or both of the two interfaces.

In a preferred mode of operation of the process of the present invention the blank of thermoformable material which is to be expanded is inserted between a pair of mold plates, one of which is positioned above the blank, and which may be termed the top or upper mold plate, and the other of which is positioned below the blank, and which may be termed the bottom or lower mold plate. In this embodiment the blank is expanded between the two mold plates in a vertical plane or direction. The blank, however, may also be expanded in a horizontal plane or direction by positioning the two mold plates at either side of the blank and otherwise conducting the process as in the manner of the vertical expansion process. In such a horizontal expansion process one of the mold plates could be characterized as the bottom mold plate, and the other the top mold plate.

The perforation means which is used at the interface between the top plate and the top surface of the blank may be termed the upper perforation means, and the perforation means which is used at the interface between the bottom mold plate and the bottom surface of the blank may be termed the lower perforation means. In the process of the present invention the perforations in the upper perforation means are not aligned, in the vertical plane, with the perforations which are in the lower perforation means. That is, the perforations in the upper perforation means are either not of the same size or shape as the perforations in the lower perforation means, or if they are of the same size and shape, the pattern of the perforations in the upper mold plate is so positioned or arranged so that, in the vertical plane, there is, at most, only a partial alignment of any one perforation in the upper perforation means with any one perforation in the lower perforation means. The two perforations means can thus be so designed and positioned that there is no overlap at all, in the vertical plane, between any one perforation in the upper perforation means and any one perforation in the lower perforation means. In the preferred embodiment of the present invention, however, the two perforation means are so designed and positioned that each perforation in each of the perforation means overlap, in the vertical plane, two or more perforations in the other perforation means.

In a preferred mode of operation of the process of the present invention the pattern of the areas of contact between the surfaces of the blank and the surfaces of the mold plates is provided by using, as the bottom plate and the top plate, perforated plates as the perforation means. The perforated plates will only provide contact with the surfaces of the sheet facing such plates at the non-perforated area of such plates.

The desired pattern of contact areas can also be supplied to the contact surfaces of the two mold plates or the blank with other perforation means. A negative of the desired pattern can be used as such other perforation means and it can be affixed to the contact surface of the sheet which is to contact the mold plates or affixed to the contact surface of the mold plates themselves, in the form of masking means, such as cut-outs in circular, elliptical, hexagonal, rectangular, triangular, etc., form of masking tape, kraft paper, "Mylar film" or other materials which will prevent the fused thermoplastic material from adhering to the surface of the mold plates. Thus, the fused plastic will only be allowed to adhere to the surfaces of the mold plates at those areas of contact between the surfaces of the mold plates and the sheet where there is no masking means present.

These "negatives" thus function, when used as perforation means in the process of the present invention, in a manner of procedure which is directly opposite to that of the perforated mold plates, the use of which as perforation means is discussed above. These "negative" perforation means thus prevent contact at the interface between the surfaces of the blank and the contact surface of the two mold plates at those places at the interface where such negative perforation means are present. The use of the perforated mold plates, on the other hand, provides a lack of contact at such interface where the blank contact surfaces of the mold plates are not present, i.e., at the areas of the interface adjacent the perforations in the mold plates. Each of these two types of perforation means, does, however, function in the same basic manner, that is, each provides a pattern of perforations in the interface between the contact surfaces of the mold plates and the surfaces of the blank.

Thus, it may be said that the cross-sectional geometry of the expanded blank is a function of the design of the areas of contact which is provided in the contact surfaces of the mold plates, or the surfaces of the negative perforation means, and which is to contact the blanks. It is such design which determines the extent to which the contact surface areas of the perforation means and the blank are kept in contact during the expansion step in the process, and the extent of such contact areas is what determines the pattern of the voids or cells in the expanding blank or sheet, and thus, in the cross-sectional geometry of the resulting expanded blank.

The voids or cells created in the sheet during the expansion step are vented through the two mold plates, or in the case of a the use of a negative perforation means, the voids or cells are vented from the outside of the blank and between the negative and the mold plate. Venting of the negative perforation means may also be accomplished by providing a vent hole over the negative perforation means which vent hold would be vented through the mold plate to the atmosphere.

The speed with which the mold plates are moved apart during the expansion of the blank is not critical. The speed to be used is governed by the cohesive flow properties of the thermoformable material used in the fused blank. Where the blank is used in the form of a sheets having thicknesses of the order of about 40 to 300 mils, such blanks may be expanded ≥ 2 to 20 times such thicknesses according to the present invention by expanding the fused blank at a rate of separation of the mold plates of about 10 to 150 mils per second.

After a desired separating distance has been achieved, the expanded blank is cooled, to a temperature below the heat distortion point of the plastic, the press is opened and the expanded blank is removed therefrom. At this point the expanded blank may or may not continue to adhere to the surfaces of the mold plates, depending on the nature of the mold surfaces and the polymeric materials, as will be discussed below.

The expaned blank is cooled to a temperature below its heat distortion point, before being removed from the press so as to freeze, so to speak, the configuration of the expanded blank, and thus prevent distortion of such configuration.

The basic process is thus one for expanding the cross-section of a blank of thermoformable material between a pair of perforation means, wherein each of the perforation means provides perforations adjacent the interface of contact between the perforation means and the blank, and wherein the perforations in each perforation means are not aligned with the perforations in the other perforation means; the expanding of the blank being attended or accompanied by the formation of one or more voids of reduced pressure within the cross-section of the expanding blank, with the pattern of occurrence of such voids being in response to the pattern of perforations in the perforation means, and wherein the voids are vented during the expanding of the blank so as to equilibrate the pressure within the voids with the pressure without the blanks and thereby regulate the uniformity and integrity of the resulting crosssectional geometry of the expanded blank.

The preferred perforation means are perforated mold plates and the blank is usually adhesively bonded, and preferably by hot tack adhesion, to the non-perforated surfaces of such perforated mold plates during the expansion or pulling process.

In a preferred embodiment of the process of the present invention it may be said that the crosssection of a blank of thermoformable material having a Ta is expanded between a pair of perforated mold plates so as to provide an integrally formed article of commerce having an expanded cross-section in the following sequence of steps:

inserting the material between the mold plates while the material is heated to a temperature which is $\geq$ the Ta of the material, the perforations in each of said mold plates being non-aligned with the perforations in the other mold plate, adhesively bonding the material by hot tack adhesion to each of the mold plates at the non-perforated portions of the perforated surfaces of the mold plates, pulling the mold plates apart, while the material is thus adhesively bonded thereto, so as to expand the cross-section of the material and thereby effect within said material one or more voids of reduced pressure, venting the voids during the pulling apart so as to equilibrate the pressure within the voids with the pressure without the material and thereby preserve the pattern and the integrity of the voids in the resulting cross-sectional geometry, and cooling the expanded material to a temperature below the heat distortion point of the material.

In the preferred mode of operation the alignment of the perforations in the two mold plates is such that there results in there being, during the expansion process, an overlap by the perforations in each of the mold plates with respect to at least one, and usually two or more, of the perforations in the other mold plate. This overlap occurs in the vertical plane where the mold plates are used one over the other and they are expanded in a vertical direction; or in the horizontal plane where the mold plates are used on either side of the blank, and the mold plates are expanded in a horizontal direction. The venting of the voids is readily accomplished through the perforated mold plates.

The mold plates which are to be used may be disengageable from the device used to move them apart during the expansion step of the process described above. One or both of the mold plates can also be more permanently affixed to such device, in which case, the cooled, expanded thermoformable material is then removed from the device and the mold plate(s) affixed thereto.

When the expanded blank is cooled below its Ta, or even below its Tm and/or Tg, it will not necessarily, in all cases, automatically lose its adhesion to the surfaces of the mold plates. The expanded blanks which are made of materials which are non-polar in nature, such as the polyolefin resins, will generally readily lose their adhesion to the surfaces of all of the types of mold plates which may be used in the process of the present invention, and which are listed below in more detail. The expanded blanks which are made of polar materials, i.e., materials comprising compounds which possess an electric moment, such as polysulfone resins and resins containing carboxyl, hydroxyl and ester groups, will tend to remain bonded to the surfaces of most, if not all, of the mold plates which may be used in the process of the present invention. However, even where adhesion between the expanded blank and the mold plates is not automatically lost upon cooling the expanded blank, the cooled expanded blank, can be mechanically stripped from the mold plates without disrupting the integrity or configurations of the expanded blank.

In addition to the use of hot tack adhesion, other means may be used for affixing the thermoformable material to the mold plates during the expansion of the cross-section of the thermoformable material. In one such other procedure the thermoformable material may be loaded with a filler which is susceptible to being magnetized such as, powdered iron and barium ferrite, and the thus filled thermoformable material may be affixed to the mold plates during the expansion step, in any desired pattern of points or areas of contact therebetween by applying a magnetic field to selected portions of the contact surfaces of the mold plates. The thermoformable material may also be affixed to the surfaces of the mold plates during the expansion step by the application of electrostatic forces between the expanding thermoformable material and selected contact areas of the surfaces of the mold plates. Regardless of the means used to affix the thermoformable material to the mold plates during the expansion step, the thermoformable material must be heated to a fused or molten state during the expansion step.

A better understanding of the process of the present invention can be obtained from the process sequences illustrated in FIGS. 1 to 7 of the drawings.

FIG. 1 shows a top view and FIG. 2 shows a cross-sectional view of a type of perforated mold plate 1 which may be used in the process of the present invention. Perforated mold plate 1 is a thin sheet of material such as aluminum or steel in which a series of regularly spaced perforations 2 are punched, so as to provide a pattern of staggered rows and columns of such perforations. The perforations may have either or both of arcuate and straight sides. The perforations 2 in mold plate 1 are all circular in shape. Each of perforations 2 are the same size circular perforation, with the various perforations being separated from each other by the continuous portion 3 of the surfaces of mold plate 1. Perforations 2 function as the perforation means discussed above, and the continuous surface 3 of mold plate 1 provides the mold plate contact surface which will contact the contact surfaces of the blank during the expansion process.

FIG. 3 shows a top view of two mold plates 1, one positioned over the other. The position of the two plates with respect to each other, in the vertical plane, is such that the perforations in the two plates are not aligned. Thus each of the perforations 2A in the upper plate 1A overlap, in such vertical plane, one or more of the perforations 2B in the lower plate 1B. This pattern of overlap is occasioned by the size, shape and spacing (staggering) of the rows and columns of perforations in each plate, as well as by the positioning of one plate, in the vertical plane, with respect to the other. This same pattern of overlap will prevail in the horizontal plane, if the position of the two mold plates with respect to each other is maintained, and they are both stood side by side on one of their thin edged sides.

Figure 5:
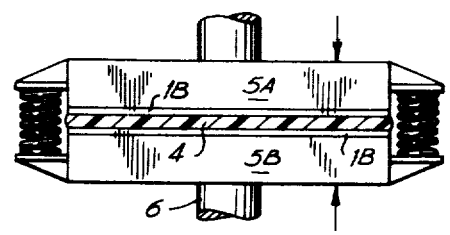
Figure 6:
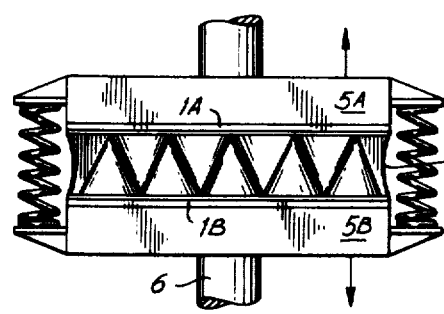

FIGS. 4 to 6 show a sequence of steps involved in using a mold plate 1 according to one modification of the process of the present invention as a top mold plate and as a bottom mold plate. In FIG. 4 there is shown a blank 4 of thermoformable material having a Ta, in the form of a smooth surfaced sheet of such material, which is inserted between the open platens, 5a and 5B, of a Carver press. To the face of each platen 5A and 5B of the press there are attached mold plates 1A and 1B, respectively. In the embodiment shown, upper mold plate 1A and lower mold plate 1B are positioned with respect to each other, in the vertical plane, as shown in FIG. 3. Mold plates 1A and 1B and platens 5A and 5B are heated, for the purposes of the present invention, to a temperature which is about Ta or 5° to 10°C. above the Ta of the blank 4. The mold plates 1A and 1B and the platens 5A and 5B may be heated before, preferably, or after the blank is inserted in the press. The mold plates are preferably heated conductively through the platens. The Carver press described herein is a 20 ton hand operated hydraulic ram 6 which actuates a movable lower platen 5B against a fixed upper platen 5A. In other presses, the upper mold platen can be movable with the lower platen fixed, or both platens can be movable. The platens are usually heated electrically. Although the Carver press is the preferred means for bringing the heated mold plates and platens into contact with the blanks, according to the present invention, other suitable devices may be used, such as heated belts.

The process of the present invention may be conducted continuously or discontinuously. Using devices such as the Carver press, the process is readily conducted discontinuously. The process may be conducted continuously by feeding a continuous blank of thermoformable material between a pair of heated continuous belts of materials suitable as mold surfaces.

FIG. 5, shows the press after it has been closed with sufficient pressure to cause the mold plates 1A and 1B to exert a slight pressure on blank 4 so as to cause the heated blank to wet the contact surfaces of mold plates 1A and 1B which come in contact with the blank. The amount of pressure required for this step is of the order of about 1 ounce to 4 pounds per square inch. The pressure causes the blank to be slightly compressed.

FIG. 6 shows the platens pulled apart after the expansion step, with the expanded blank 7 adhering to points or areas of contact with plates 1A and 1B.

Figure 7:
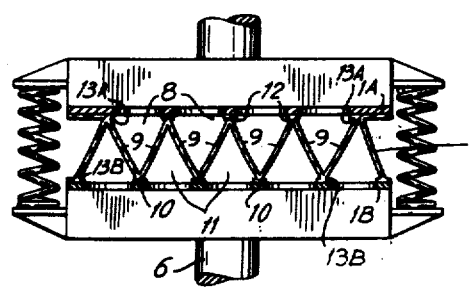
FIG. 7 shows a cross-section of an expanded blank made as disclosed in FIGS. 4–6 before it has been removed from the mold plates.

FIG. 7 shows a cross-sectional view of expanded blank 7 between top mold plate 1A and lower mold plate 1B after the expansion step, but before the expanded blank is removed from the press or the mold plates. The cross-sectional view shows that the expanded blank has a plurality of cells, about one-half of which are cells 8 which are open at the top face of the expanded blank and closed at sides or walls 9 and apexed bases 10 thereof. The closed bases 10 of cells 8 were formed by contact of the blank 4 during the expansion process with continuous areas 3 of lower mold plate 1B. The remaining cells 11 are open at the lower face of the expanded blank and closed at sides or walls 9 and apexed tops 12 thereof. The closed tops 12 of cells 11 were formed by contact of the blank 4 during the expansion process with continuous areas 3 of upper mold plate 1A. Walls 9 are I beam shaped, and act as common walls for adjacent cells 8 and 11. The flanged portion 13A of each top or peak 12 of the lower cells tends to form a lip member, more or less continuously around the open end of each upper cell 8, and, similarly, the flanged portion 13B of the bases 10 of the upper cells 8 tends to form a lip member, more or less continuously, aroung the open end of each lower cell 11.

During the expansion step, as will be discussed in more detail below, areas of reduced pressure or cells 8 and 11 arise within the cross-section of the expanding blank 7. The side walls of the individual cells 8 and 11 are defined by rib-members 9 of the expanded blank. The limits of cells 8 and 11 are thus defined by the contact surfaces of the two mold plates and side walls 9. The reduced pressure in cells 8 and 11 is caused by the fact that each cell tends to become a sealed chamber when the blank 4 fuses to the contact surfaces of the mold plates 1A and 1B and as the mold surfaces are pulled apart, the sealed cells become enlarged, thus creating areas of reduced pressure. To prevent the higher ambient pressures from distorting or rupturing expanded walls 9 of the blank, the cells of the blank are vented during the expansion step so as to equilibrate the pressure within such cells with the ambient pressure outside the blank. This venting tends to preserve the pattern and the integrity of the resulting cross-sectional geometry of the expanded blank. In this embodiment of the present invention, the venting is accomplished through the perforations in the two mold plates and the imperfect seal that exists between the surfaces of platens 5A and 5B and mold plates 1A and 1B, respectively.

After the platens have been expanded the desired distance they are cooled to a temperature which is below the heat distortion point of the plastic in the blank. The cooling may be allowed to occur in the ambient air, or by circulating a cooling medium through the platens, or in some cases by a liquid coolant spray, or by conduction thhrough cooled platens, or by a combination of such procedures.

The mold plates may be readily disengagable from the rest of the press so as to allow another set of mold plates to be inserted and used in the press with another blank of thermoformable material while a previously used set of mold plates having an expanded blank therebetween is allowed to cool. The mold plate should also be disengagable from the rest of the press where the nature of the fusible blank and of the mold plate is such that the cooled expanded blank remains bonded to one or both of the mold plates. In the latter case laminates may be readily formed with the disengagable mold plates as skin laminae and the expanded blank as a core lamina. When such laminates are desired, similar or dissimilar mold plates can be used as to provide laminates with similar or dissimilar skin laminae, or even laminates wherein only one of the removable mold plates remains bonded to the cooled expanded blank.

Figure 8:
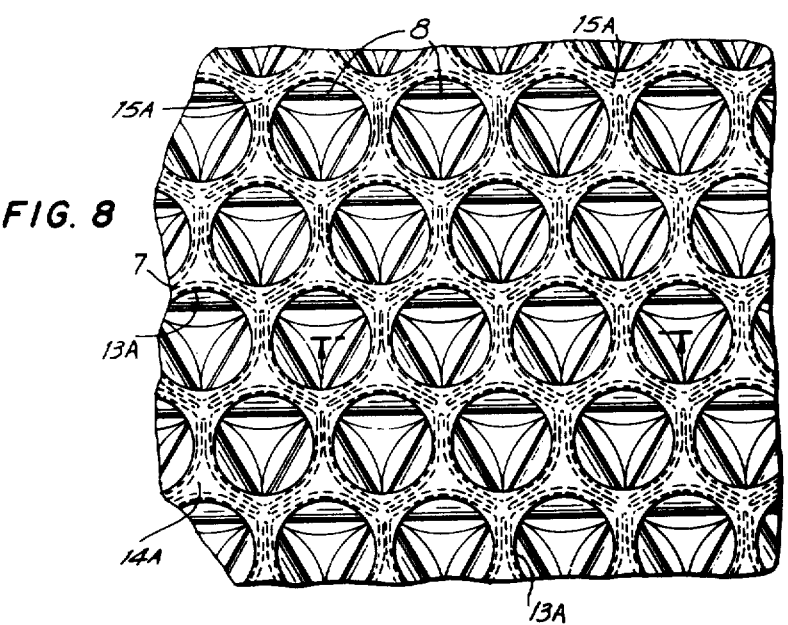
FIG. 8 shows a partial top view.
Figure 9:
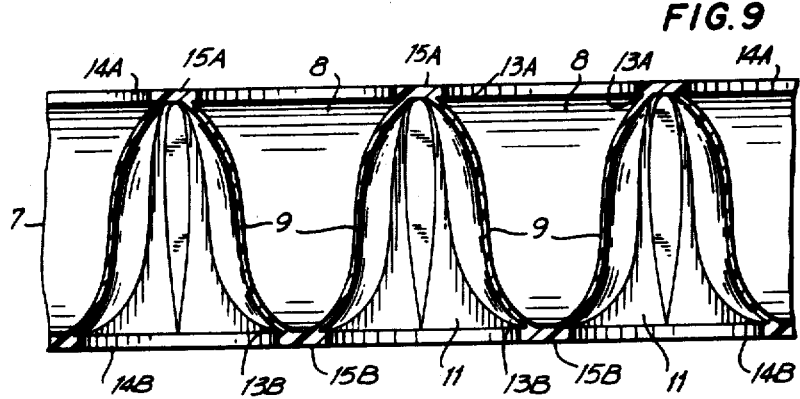
FIG. 9 shows a partial cross-sectional view, of such blank after it has been removed from the mold plates.

FIG. 8 shows a section of a top view, and FIG. 9 shows a section of a cross-sectional view of expanded blank 7, which has been produced as described above with reference to FIGS. 1–7, after it has been removed from the press and the platens. The top face 14A of expanded article 7 provides a replication of the blank contact surface of upper mold plate 1A to which it adhered during the expansion step. Thus the open ends of upper cells 8 replicate perforations 2 of mold plate 1A, and continuous portions or areas 15A of the top face of expanded blank 7 replicate the continuous areas 3 of mold plate 1A. In a similar manner the continuous surface 15B of lower face 14B of expanded blank 7 provides a replication of the blank contact surface of lower mold plate 1B. As seen in FIG. 8, each of the circular open ends of upper cells 8 overlaps, in the vertical plane, about three of the circular open ends of the lower cells 11 in the expanded blank. FIG. 9 shows that side walls 9 of the cells tend to be rotund, rather than flat. FIG. 8 shows lip member 13A around the opening of each cell 8, and FIG. 9 shows lip members 13A and 13B at the openings of cells 8 and 11, respectively.

For aesthetic, or other purposes, it may be desired to expand the cross-section of the blank in a non-uniform manner so as to provide expanded blanks which have cross-sectional areas of various degrees of thickness.

Figure 10:
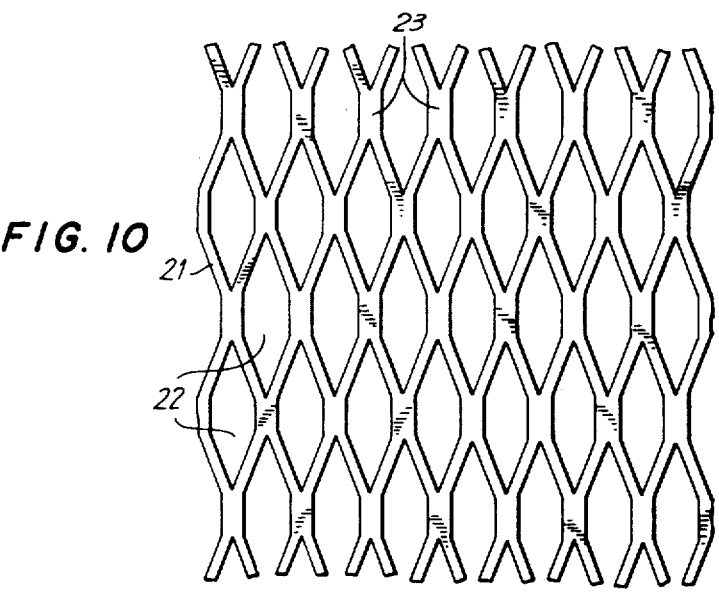
FIG. 10 shows a top view of a second type of removable mold plate having a perforated face.

FIG. 10 shows a top view of another type of perforated mold plate 21 which may be used in the process of the present invention. Mold plate 21 is a relatively thin sheet of expaned metal mesh having a diamond shaped pattern of perforations 22 punched therethrough. The continuous portion 23 of the surface of the sheet provides the contact surfaces which will contact the blank of plastic during the expansion step in the process. Mold plate 21 can be used as both an upper and lower mold plate.

Figure 11:
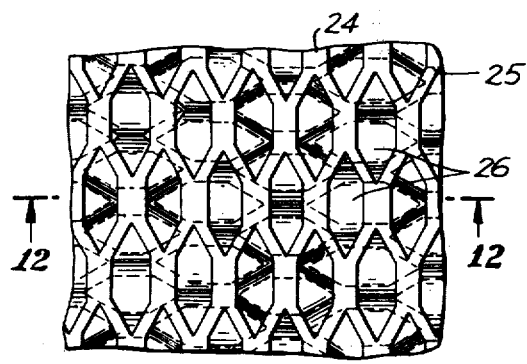
FIGS. 11–13 show different expanded structures made with the perforated mold plates of FIG. 10.
Figure 12:
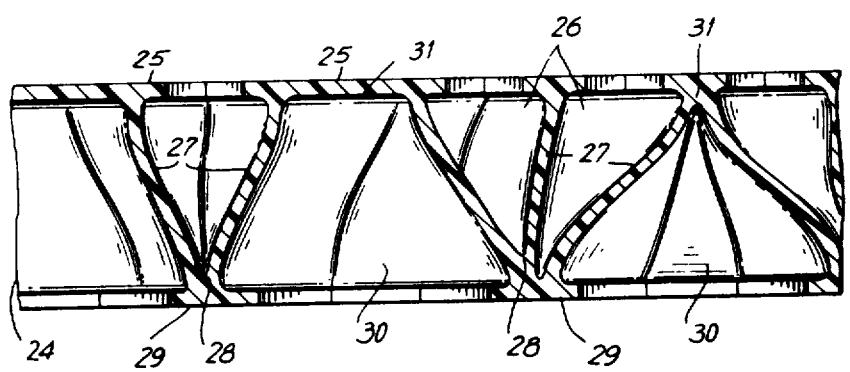

FIG. 11 shows a top view, and FIG. 12 shows a cross-sectional view, of an expanded blank 24 which may be made between two of mold plates 21. The expanded blank shown in FIGS. 11-12 was thus prepared by expanding a sheet of plastic having a Ta, with the aid of hot tack adhesion as described above, between two expanded mesh mold plates 21. In this embodiment of the process of the present invention the faces of the two mold plates which are to contact the plastic are arranged in the press so that one is at right angles, so to speak, to the other one. Thus, the diamond shaped pattern of the upper mold plate is turned 90° with respect to the diamond shaped pattern of the lower mold plate. FIG. 11 is a top view of the expanded blank 24 after the mold plates have been removed and FIG. 12 shows a cross-section of the expanded blank 24. The upper surface 25 of expanded blank 24 shows a replication of the mesh faced mold plate to which it adhered during the expansion step. Voids 26 are open at the face of top surface 25 and closed at the sides 27 and bases 28 thereof. The closed bases 28 of voids 26 are formed by the continuous mesh lower surface 29 of the expanded blank. Similarly voids 30 are open at the face of the lower surface 29 of the expanded blank and are closed at the sides 29 and apexes or tops 31 thereof. The closed tops of voids 30 are formed by the continuous mesh upper surface 25 of the expanded blank.

The sides or rib members 27 of the voids or cells 26 and 30 have an essentially I beam configuration. Each rib member 27 forms part of the side of both a cell 26 and a cell 30.

During the expansion step in the process the resulting voids 26 and 30 are vented through the openings in the top and bottom mesh plates, respectively, and also through the imperfect seal that exists between the surfaces of such mold plates and the surface of the upper and lower platens of the press to which the mesh plates are affixed during the expansion process.

As seen in FIG. 11 the openings of upper cells 26 are not aligned, in the vertical plane, with the openings of lower cells 30. Thus, each of the diamond shaped open ends of upper cells 26 overlaps on the average, in the vertical plane, at least two of the diamond shaped open ends of lower cells 30 in the expanded blank. This pattern of overlap in the cell openings, as seen in FIG. 11, is a replication of the pattern of the overlap, in the vertical plane, of the perforations in the faces of the two mesh plates which were used as the upper and lower mold plates during the preparation of expanded blank 25.

It can also be seen that about one-half of all the cells in the blank are cells 26 which are open at the top face of the expanded blank 24, and that the remaining cells are cells 30 which are open at the lower face of blank 24.

Figure 13:
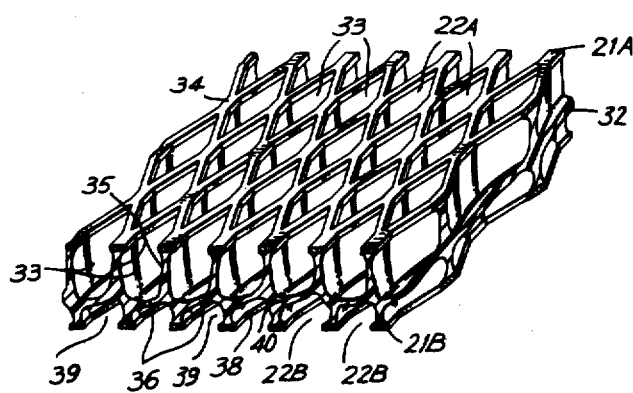

FIG. 13 shows, in perspective, another type of expanded blank 32 which may be made with mold plate 21 as shown in FIG. 10. FIG. 13 shows the blank 32 after it has been expanded in the press, and after the expanded blank has been removed from the press with upper and lower mold plates 21A and 21B, respectively, still bonded thereto. In preparing expanded blank 32, mold plates 21A and 21B were arranged in the press so that each row and column of perforations 22A in upper mold plate 21A were aligned in the vertical plane with a row and column of perforations 22B in lower mold plate 21B, and then upper mold plate 21A was shifted with respect to the X axis of lower mold plate 21B, so that each perforation 22A of upper mold plate 21A overlapped, in the vertical plane, one-half of two adjacent perforations 22B in lower mold plate 21B. Voids or cells 33 are open at the face of top surface 34 and sealed at the sides 35 and bases 36 thereof. The sealed bases 36 of cells 33 are formed by the continuous mesh lower surface 38 of expanded blank 32. Similarly, cells 39 are open at the face of lower surface 38 of the expanded blank and are sealed at the sides 35 and tops 40 thereof. The sealed tops of cells 39 are formed by the continuous mesh upper surface 34 of the expanded blank. The sides or wall, or rib, members 35 of cells 33 and 39 have an essentially I beam configuration. Each rib member 35 form part of the wall of both at least one cell 33 and at least one cell 39.

During the expansion step in the process cells 33 and 39 are vented through perforations 22A and 22B in the upper and lower mold plates 21A and 21B, respectively, and also through the imperfect seal that exists between the surfaces of such mold plates and the surface of the upper and lower platens of the press to which the mesh plates are affixed during the expansion process.

About one-half of all the cells in the expanded blank 32 are cells 33 which are open at the top face 34 of the expanded blank 32, and the remaining cells are cells 39 which are open at the lower face 38 of blank 32.

Figure 14:
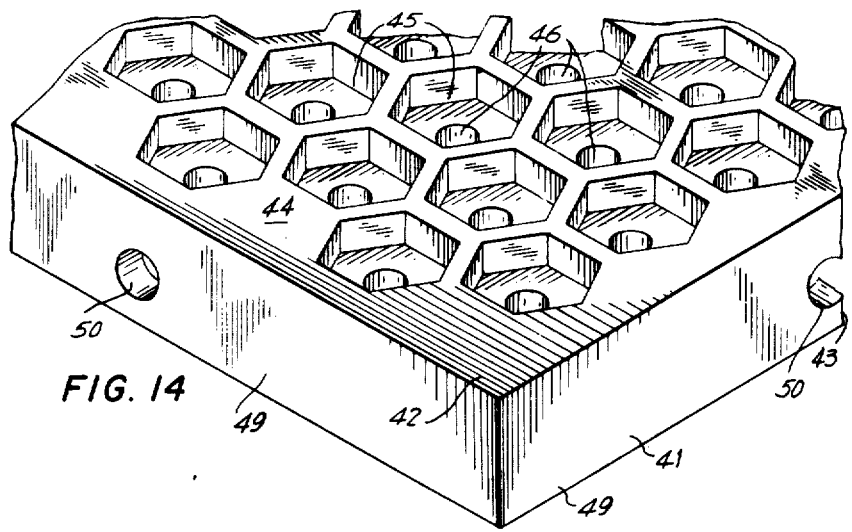
FIGS. 14, 15 and 16 show partial top, bottom and cross-sectional views, respectively, of a third type of perforated mold plate.
Figure 15:
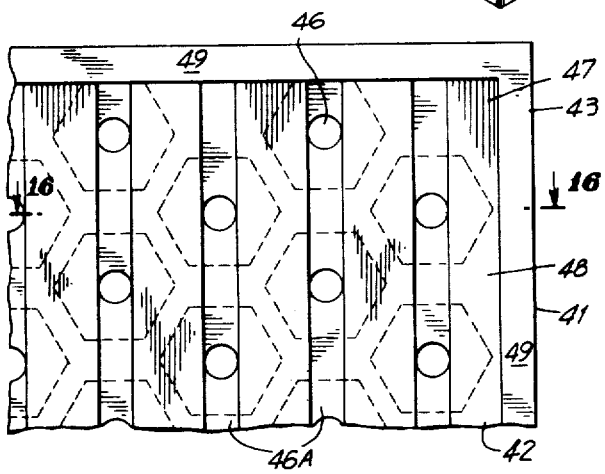
Figure 16:
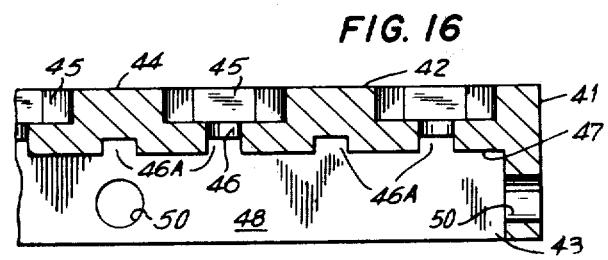

FIG. 14 shows a partial top view in perspective, FIG. 15 shows a partial view of the reverse side, and FIG. 16 shows a partial cross-sectional view, of another type of mold plate 41 which has a series of recessed cavities therein as perforations and which may be used as a mold plate in the process of the present invention. Mold plate 41 has a top sheet 42 of metal mounted on a hollow U-shaped frame 43. In the front face 44 of the sheet 42 a series of regularly spaced and staggered rows of hexagonal shaped perforations 45 were machined. Each of the hexagonal perforations 45 was only machined about half way through top sheet 42. In the center of the base of each of the hexagonal perforations 45 there was then drilled a small circular vent hole 46 through the remainder of sheet 42 and which exited out the other (back) face 47 of sheet 42. The circular vent holes 46 were about a third of the diameter of the hexagonal perforations 45. The hexagonal perforations 45 were all the same size. Vent holes 46 open out the back face 47 of sheet 42 into a hollow area 48 bounded by the three legs 49 of U-shaped frame 43. Channels 46A are provided in the back-face 47 of sheet 42 to link each column of vent holes 46 to facilitate venting therethrough. Screw holes 50 are also provided in the walls of legs 49 for fastening mold plate 41 to the Carver press. Two of these mold plates 41 were used in a Carver press as described above to prepare the various expanded blanks shown in FIGS. 17–22. Venting of the back of the mold plate to the outside of the plate is accomplished through the open wall of U-shaped frame 49, which is not shown.

When inserted in the Carver press as the top and bottom plates thereof, the two plates 41 were positioned and aligned so that the two front faces 44 thereof faced each other and the hexagonal perforations 45 in the top plate were not completely aligned in the vertical plane, with the hexagonal perforations 45 in the lower plate. The hexagonal perforations 45 in the upper plate were positioned so that each of the perforations in the upper plate overlapped, in a vertical plane, two or more of the hexagonal perforations in the lower plate, as will be discussed in more detail below.

Figure 17:
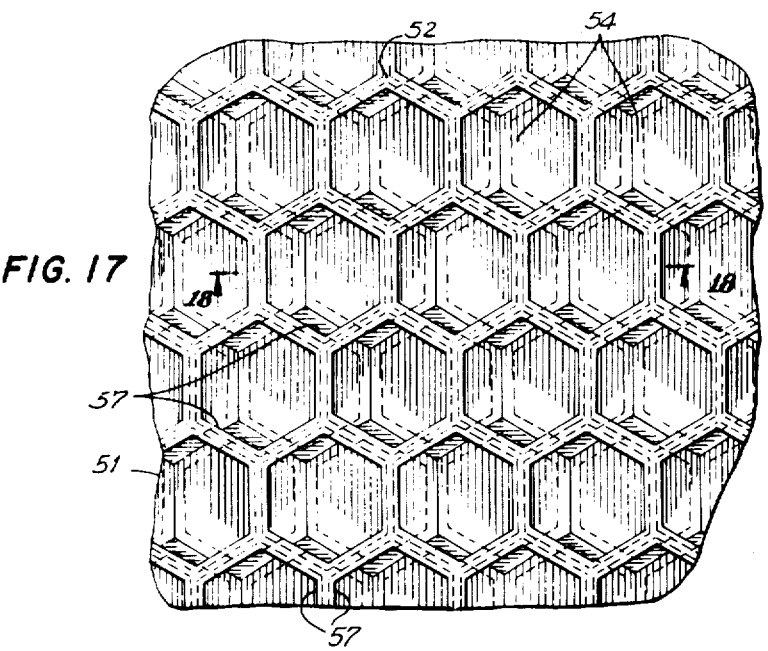
FIGS. 17–22 show various expanded blanks that may be made with two of the perforated mold plates of FIGS. 14–16.

FIG. 17 shows a top view of expanded blank 51. The top face 52 of expanded blank 51 provides a replication of the perforated surface of the upper plate of the press to which blank 51 adhered during the expansion step. The lower face 53 of the expanded blank is a duplicate of such upper face 52 and provides a replication of the perforated surface of the lower mold plate of the press to which blank 51 adhered during the expansion step. FIG. 17 thus shows that the alignment and positioning in the press of the two mold plates 41 that were used to prepare expanded blank 51 was such that each horizontal row of perforations 45 in the upper mold plate was aligned, in a vertical plane, with a horizontal row of perforetions 45 in the lower mold plate, and that the upper mold plate was shifted in the horizontal direction so that each of the perforations 45 in the upper mold plate overlapped, in the vertical plane, about one-third of the surface area of one perforation 45, and about two-thirds of the surface area of a second adjacent perforation 45, in the lower mold plate.

Figure 18:
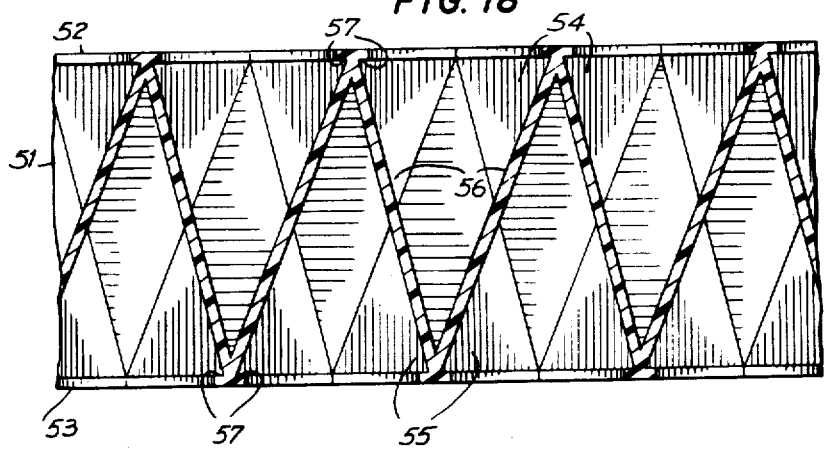

FIG. 18 shows a cross-section of expanded blank 51. Expanded blank 51 provides two sets of regularly shaped and spaced cells which are open at one end and sealed at the other end thereof. Each cell is conical in shape. As shown in FIG. 18 one set 54 of such cells is open at the upper face 52 of blank 51, and sealed at the lower face 53 thereof, and the second set 55 of such cells is open at lower face 53, and sealed at upper face 52. The cells are separated by I beam shaped rib members 56. The rib members 56 defining each cell join together in an apex at the base of such cell to form a sealed base. The tops and bases of rib members 56 provide the continuous portion of the perforated top face 52 and base 53 of expanded blank 51. Lip members 57 which are present around the periphery of each cell 54 and 55 are not too pronounced because of the relatively close spacing and alignment of the perforations in the plates with which expanded blank 51 was prepared, and also because the perforations were angular and not circular or arcuate. The use of a circular or arcuate shaped perforation in the platens tends to produce a more pronounced lip member around the periphery of the cell openings in the expanded blank, as shown in FIG. 9. A deformable or pronounced lip member is not necessarily advantageous in an expanded blank that is to be used as a load bearing member. The pronounced lip member would represent resin that was not being used to strengthen rib members 56, as in expanded blank 51, which would be the true load bearing elements of the expanded blank, when such blank were used for load bearing purposes, but does however, add to its flexural strength by providing a greater area to the discontinuous skin elements.

During the expansion of the sheet of plastic to form expanded blank 51 cells 54 and 55 were vented, in turn, through the perforations 45, vent holes 46, channels 46A, and the open wall of U-shaped frame 49 in the upper and lower mold plates 41 of the press.

Figure 19:
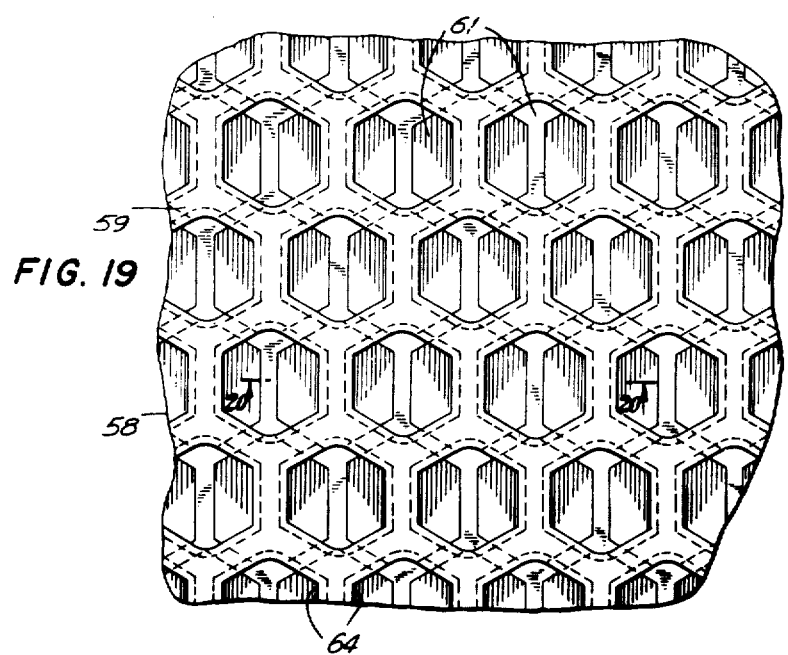

FIG. 19 shows a top view of expanded blank 58. The top face 59 of expanded blank 58 provides a replication of the perforated surface of the upper plate of the press to which blank 58 adhered during the expansion step. The lower face 60 of the expanded blank is a duplicate of such upper face 59 and provides a replication of the perforated surface of the lower mold plate of the press to which blank 58 adhered during the expansion step. FIG. 19 thus shows that the alignment and positioning in the press of the two mold plates 41 that were used to prepare expanded blank 58 was such that each horizontal row of perforations 45 in the upper mold plate was aligned, in a vertical plane, with a horizontal row of perforations 45 in the lower mold plate, and that the upper mold plate was shifted in the horizontal direction so that each of the perforations 45 in the upper mold plate overlapped, in the vertical plane, about one-half of the surface area of each of two adjacent perforation 45 in the lower mold plate.

Figure 20:
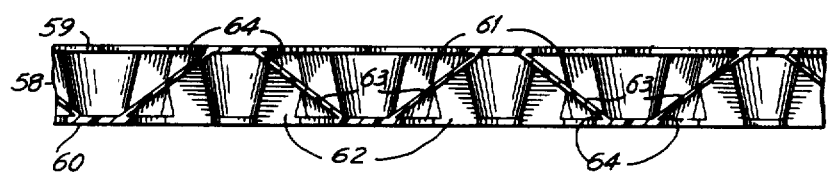

FIG. 20 shows a cross-section of expanded blank 58. Expanded blank 58 provides two sets of regularly shaped and spaced cells which are open at one end and sealed at the other end thereof. Each cell is conical in shape. As shown in FIG. 20 one set 61 of such cells is open at the upper face 59 of blank 58 and sealed at the lower face 60 thereof, and the second set 62 of such cells is open at lower face 60 and sealed at upper face 59. The cells are separated by I beam shaped rib members 63. The rib members 63 defining each cell join together in an apex at the base of such cell to form a sealed base. The tops and bases of rib members 63 provide the continuous portion of the perforated top face 59 and base 60 of expanded blank 58. Lip members 64 which are present around the periphery of each cell 61 and 62 are not too pronounced because of the relatively close spacing and alignment of the perforations in the plates with which expanded blank 58 was prepared, and also because the perforations were angular and not circular or arcuate as discussed above with respect to expanded blank 51.

During the expansion of the sheet of plastic to form expanded blank 58 cells 61 and 62 were vented, in turn, through the perforations 45, vent holes 46, channels 46A, and the open wall of U-shaped frame 49 in the upper and lower mold plates 41 of the press.

Figure 21:
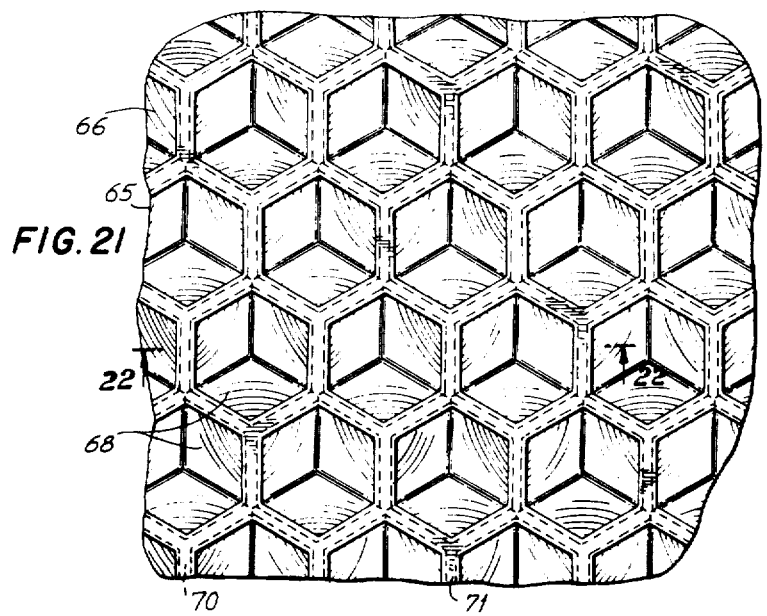

FIG. 21 shows a top view of expanded blank 65. The top face 66 of expanded blank 65 provides a replication of the perforated surface of the upper plate of the press to which it adhered during the expansion step. The lower face 67 of the expanded blank is a duplicate of such upper face 66 and provides a replication of the perforated surface of the lower mold plate of the press to which blank 65 adhered during the expansion step. FIG. 21 thus shows that the alignment and positioning in the press of the two mold plates 41 that were used to prepare expanded blank 65 was such that each horizontal row of perforations 45 in the upper mold plate was aligned, in a vertical plane, with two of the horizontal rows of perforations 45 in the lower mold plate in such a way that each of the perforations 45 in the upper mold plate overlapped three adjacent perforations 45 in the lower mold plate. Each of the perforations 45 in the lower mold plate was overlapped to the same extent, in terms of overlapped surface area. This can be accomplished by first aligning each horizontal row of perforations 45 in the upper mold plate with a horizontal row of perforations 45 in the lower mold plate, and then shifting the upper mold plate on its X axis, with respect to the X axis of the lower mold plate, so that each perforation 45 in the upper mold plate overlaps two adjacent perforations 45 in the lower mold plate, and then further shifting the upper mold plate on its Y axis, with respect to the Y axis of the lower mold plate, so that each perforation in the upper mold plate overlaps a portion of three adjacent perforations 45 in the lower mold plate, with such latter three perforations in the lower mold plate including the two perforations 45 in the lower mold plate that were overlapped in the first shifting step. The shifting of the two mold plates with respect to each other can be such that one or the other, or both of the plates are shifted in their X and/or Y axis with respect to each other to accomplish the desired overlapping of the perforations in the two plates. The sequence of steps involved in the aligning and shifting of the mold plates is not critical. This is accomplished before the blank is inserted between the aligned and positioned mold plates.

Figure 22:
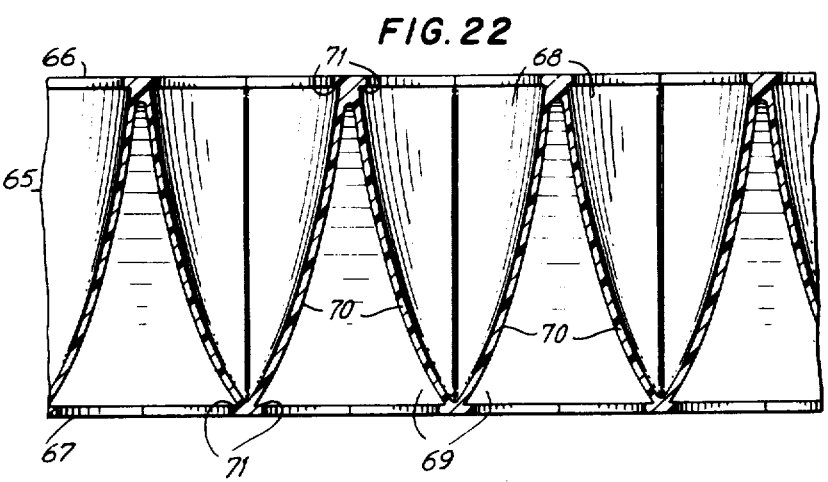

FIG. 22 shows a cross-section of expanded blank 65. Expanded blank 65 also provides two sets of regularly shaped and spaced cells which are open at one end and sealed at the other end thereof. Each cell is conical in shape. As shown in FIG. 22 one set 68 of such cells is open at the upper face 66 of blank 65, and sealed at the lower face 67 thereof, and the second set 69 of such cells is open at lower face 67, and sealed at upper face 66. The cells are separated by I beam shaped rib members 70. The rib members 70 defining each cell join together in an apex at the base of such cell to form a sealed base. The tops and bases of rib members 70 provide the continuous portion of the perforated top face 66 and base 67 of expanded blank 65. Lip members 71 which are present around the periphery of each cell 68 and 69 are not too pronounced because of the relatively close spacing and alignment of the perforations in the plates with which expanded blank 65 was prepared, and also because the perforations were angular and not circular or arcuate, as discussed above with respect to expanded blanks 51 and 58.

During the expansion of the sheet of plastic to form expanded blank 65 cells 68 and 69 were vented, in turn, through the perforations 45, vent holes 46 and channels 46A and the open wall of U-shaped frame 49 in the upper and lower mold plates 41 of the press.

Figure 23:
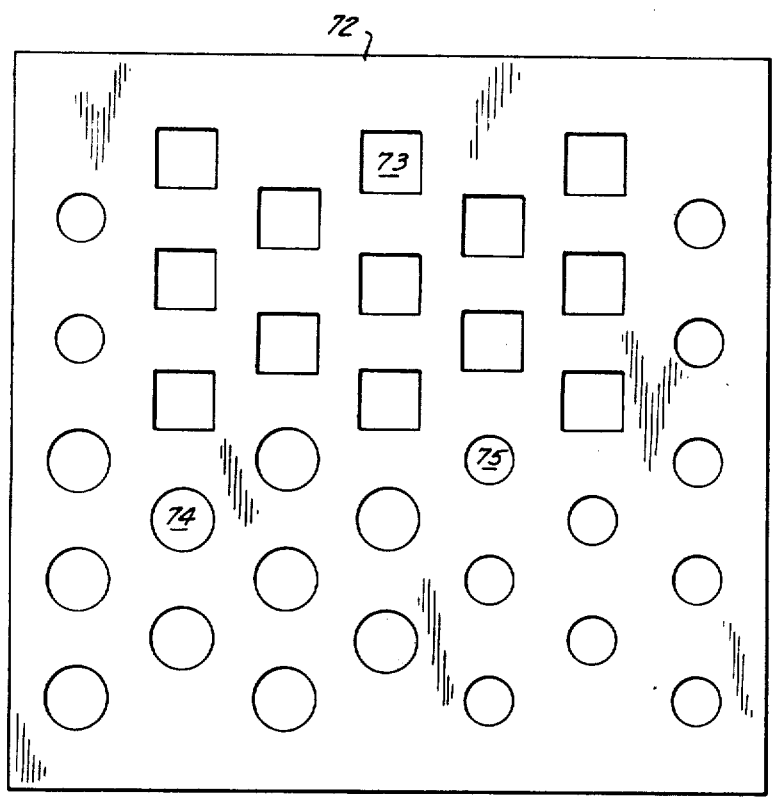
FIG. 23 shows a top view of a fourth type of perforated mold plate.

FIG. 23 shows a top view of another type of thin mold plate 72 which may be used in the process of the present invention. Mold plate 72 has a series of three different shaped or sized perforations punched therein, squares 73, large circles 74 and small circles 75. Squares 73 have a slightly larger surface area than circles 74, which have a larger surface area than circles 75. As shown in FIG. 23, all the perforations are arranged in ordered columns in one, or the vertical direction, and in a staggered array in the other, or horizontal direction. All of the squares are the same size, as are all the large circles, and the small circles.

Figure 24:
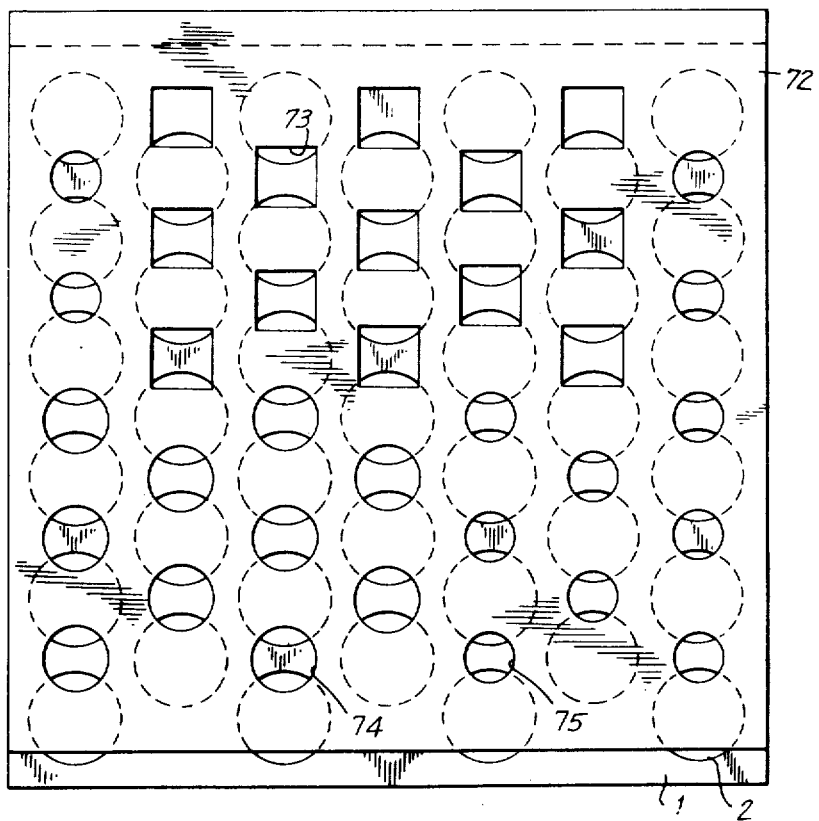
FIG. 24 shows, in perspective, the pairing, in a non-aligned manner, of a bottom mold plate of FIG. 3 and a top mold plate of FIG. 23.

FIG. 24 shows, a top view of a mold plate 72 positioned above a mold plate 1 of FIG. 1 in one alignment of such plates with respect to each other which may be used in the process of the present invention. In the alignment of mold plates 1 and 72 shown in FIG. 24, mold plate 1 is in position to be used as a lower mold plate, and mold plate 72 is in position to be used as a upper mold plate. The perforations 2 in lower mold plate 1 are all larger in area than any of the three perforations 73, 74 and 75 in mold plate 72. The distance between any two adjacent perforations in each vertical column of the perforations in upper plate 72 varies but is always less than the diameter of perforations 2 in lower mold plate 1, all of which perforations 2 have the same diameter. Each vertical column of perforations in upper mold plate 72 is aligned with a vertical column of perforations in lower mold plate 1, and in the vertical plane, each of the perforations 2 in lower mold plate 1 is overlapped with two of the perforations in upper mold plate 72.

Figure 25:
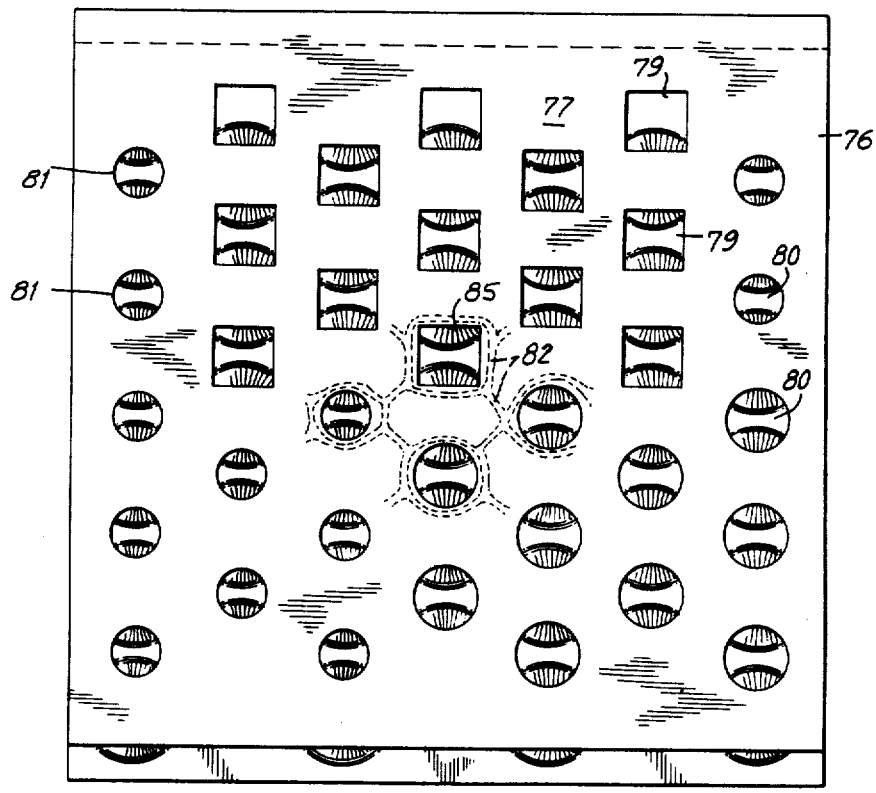
FIG. 25 shows a partial top view.
Figure 26:
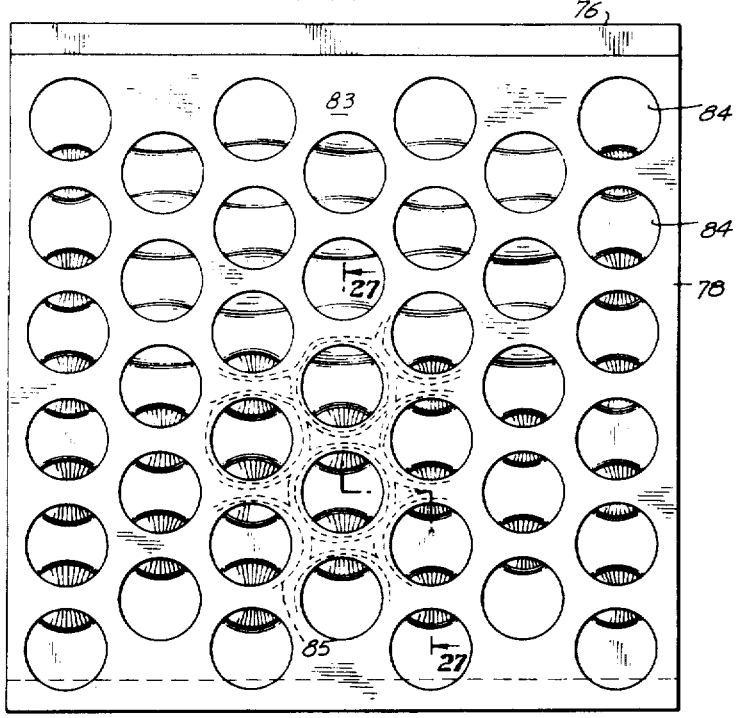
FIG. 26 shows a partial bottom view and FIG. 27 shows a partial cross-sectional view of an expanded blank made with the pair of non-aligned mold plates as shown in FIG. 24.
Figure 27:
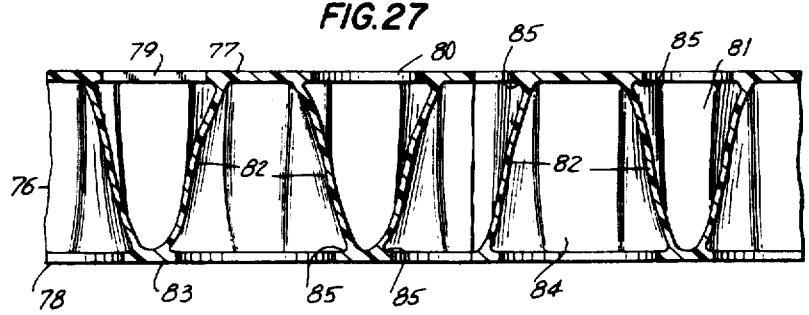

FIG. 25 shows a top view, FIG. 26 shows a bottom view, and FIG. 27 shows a cross-sectional view, of an expanded blank 76 made with the aligned mold plates 1 an 72 as shown in FIG. 24. The expanded blank 76 shown in FIGS. 25-27 was thus prepared by expanding a sheet of plastic having a Ta, with the aid of hot tack adhesion as described above, between a pair of mold plates 1 and 72 arranged as shown in FIG. 24. The upper surface 77 of expanded blank 76 shows a replication of mold plate 72 to which it adhered during the expansion step. The lower surface 78 of expanded blank 76 shows a replication of mold plate 1 to which it adhered during the expansion step. Voids 79, 80 and 81 in upper surface 77 have the square, the larger circle and the smaller circle, respectively, shaped openings shown in surface 77 and are open at upper surface 77 and closed at sides 82 and bases 83 thereof. The sealed base 83 of voids 79, 80 and 81 are formed by the continuous portions of lower surface 78. Voids 84, with circular shaped openings, are open at the face of lower surface 78 of blank 76 and are sealed at the sides 82 and apexs or tops 83 thereof. The sealed tops of voids 84 are formed by the continuous portions of upper surface 77 of the blank.

The common side or rib members 82 of the voids or cells 79, 80 and 81 on the one hand, and cells 84 on the other hand, have an essentially I beam configuration. Each rib or wall member 82 forms part of the side of both a cell 84, and one or more of cells 79, 80 and 81.

Continuous lip members 85 which are present aroung the periphery of the openings of each cell 79, 80, 81 and 84 are more pronounced around the circular peripheries of cells 80, 81 and 84 than around the rectangular periphery of cells 79.

Cells 79, 80, 81 and 84 are generally all of the same height but their volumes are of the order of $81 < 80 < 79 < 84$, and the relative size of the volumes of such cells is a function of the relative size of perforations 75, 74, 73 and 2, respectively. Cells 79, 80 and 81 tend to be more conical in shape, than cells 84, whereas cells 84 tend to be more cylindrical in shape than cells 79, 80 and 81. The sealed ends of all of these cells, however, tend to be narrower than the open ends thereof.

During the expansion step in the process the resulting voids 79, 80, 81 and 84 are vented through the perforations 73, 74, 75 and 2 respectively in the upper and lower mold plates, and also through the imperfect seal that exists between the surfaces of such mold plates and the surfaces of the upper and lower platens of the press to which the mold plates are affixed during the expansion process.

As seen in FIG. 25 the openings of upper cells 79, 80 and 81 are not aligned, in the vertical plane, with the openings of lower cells 84. Thus each of lower cells 84 are overlapped, in the vertical plane, by two adjacent cells 79, 80 and/or 81. This pattern of overlap in the cell openings, as seen in FIG. 25, is a replication of the pattern of overlap, in the vertical plane of the perforations in the faces of the two mold plates 72 and 1 which were used as the upper and lower mold plates, respectively, during the preparation of expanded blank 76.

It can also be seen that about one-half of all the cells in the blank are cells 84 which are open at the lower face of expanded blank 76, and that the remaining cells are cells 79, 80 and 81 which are open at the upper face of blank 76.

Figure 28:
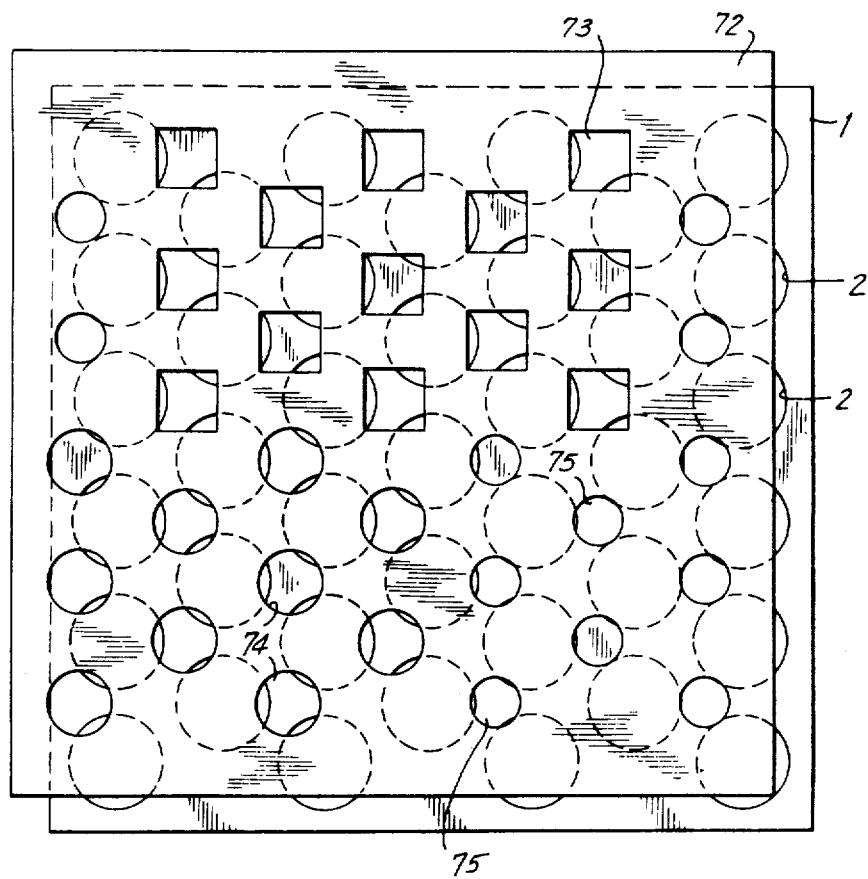
FIG. 28 shows, in perspective, the pairing in a second non-aligned manner of a bottom mold plate of FIg. 3 and a top mold plate of FIG. 23.

FIG. 28 shows, a top view of a mold plate 72 positioned above a mold plate 1 of FIG. 1 in a second alignment of such plates with respect to each other which may be used in the process of the present invention. In the alignment of mold plates 1 and 72 shdown in FIG. 28, mold plate 1 is in position to be used as a lower mold plate, and mold plate 72 is in position to be used as a upper mold plate. The perforations 2 in lower mold plate 1 are all larger in area than any of the three perforations 73, 74 and 75 in mold plate 72. The distance between any two adjacent perforations in each vertical column or diagonal row of the perforations in upper plate 72 varies but is always less than the diameter of perforations 2 in lower mold plate 1, all of which perforations 2 have the same diameter. To arrange the aligned mold plates shown in FIG. 28, each vertical column of perforations in upper mold plate 72 was first aligned with a vertical column of perforations in lower mold plate 1, so that in the vertical plane, each of the perforations 2 in lower mold plate 1 was overlapped with two of the perforations in upper mold plate 72, as shown in FIG. 25, and than upper mold plate 72 was shifted to the right or left so that, in the vertical plane, each of the perforations 2 was overlapped by two or three of the perforations in upper mold plate 72 which were in two different vertical columns thereof.

Figure 29:
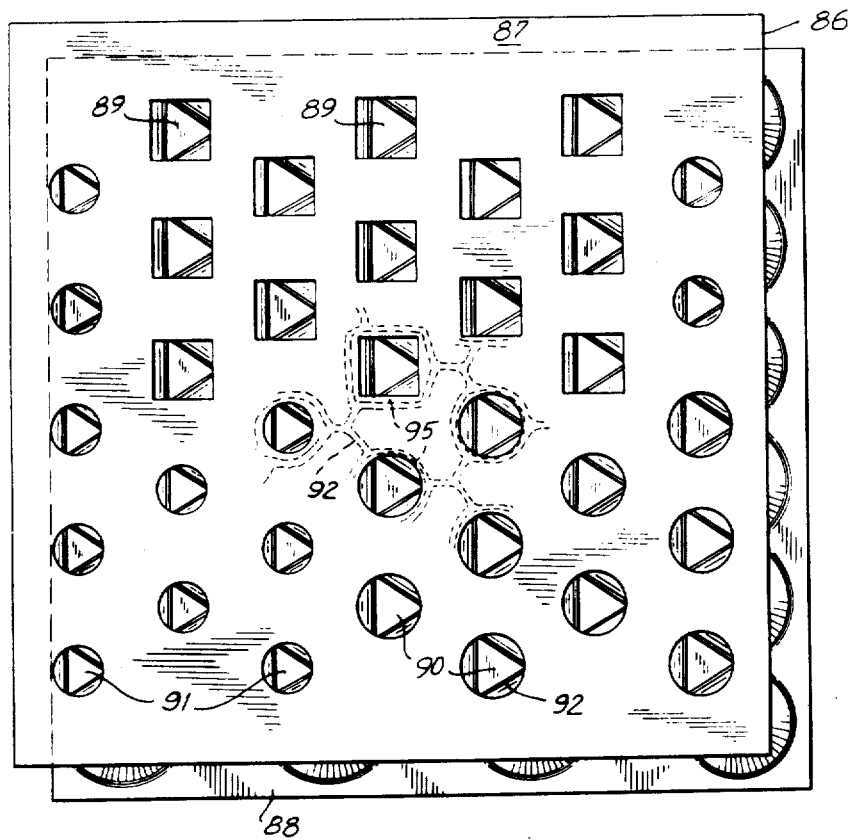
FIG. 29 shows a partial top view.
Figure 30:
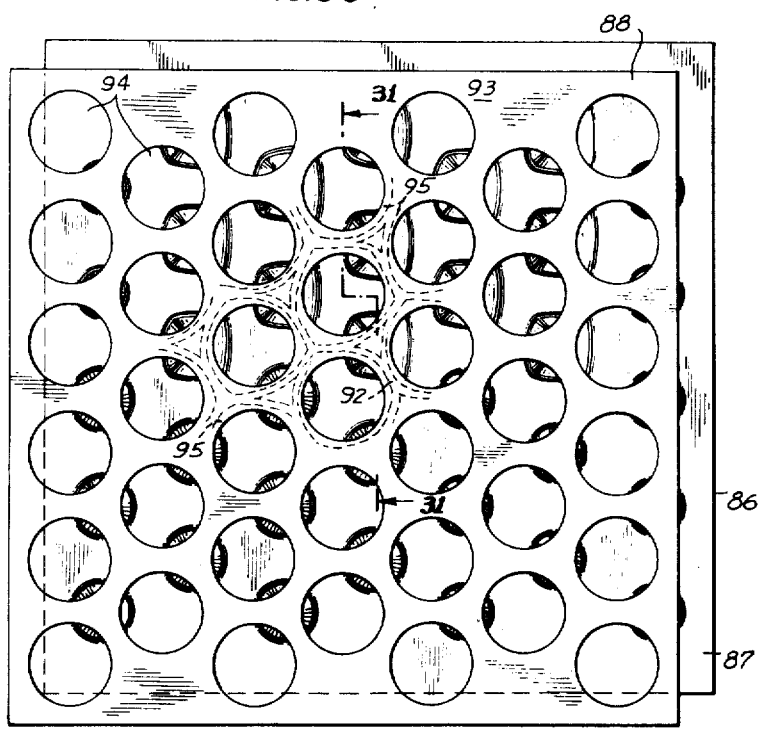
FIG. 30 shows a partial bottom view and FIG. 31 shows a partial cross-sectional view of an expanded blank made with the pair of non-aligned mold plates as shown in FIG. 28.
Figure 31:
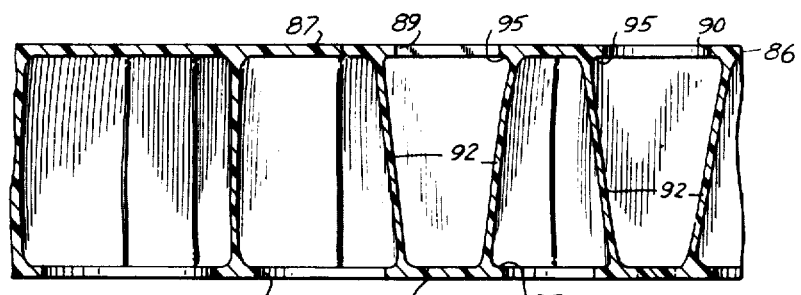

FIG. 29 shows a top view, FIG. 30 shows a bottom view, and FIG. 31 shows a cross-sectional view, of an expanded blank 86 made with the aligned mold plates 1 and 72 as shown in FIG. 28. The expanded blank 86 shown in FIGS. 25–27 was thus prepared by expanding a sheet of plastic having a Ta, with the aid of hot tack adhesion as described above, between a pair of mold plates 1 and 72 arranged as shown in FIG. 28. The upper surface 87 of expanded blank 86 shows a replication of mold plate 72 to which it adhered during the expansion step. The lower surface 88 of expanded blank 86 shows a replication of mold plate 1 to which it adhered during the expansion step. Voids 89, 90 and 91 in upper surface 87 have the square, the larger circle and the smaller circle, respectively, shaped openings shown in surface 87 and are open at upper surface 87 and closed at sides 92 and bases 93 thereof. The sealed based 93 of voids 89, 90 and 91 are formed by the continuous portions of lower surface 88. Voids 94, with circular shaped openings, are open at the face of lower surface 88 of blank 86 and are sealed at the sides 92 and apexs or tops 93 thereof. The sealed tops of voids 94 are formed by the continuous portions of upper surface 87 of the blank.

The common side or rib members 92 of the voids or cells 89, 90 and 91 on the one hand, and cells 94 on the other hand, have an essentially I beam configuration. Each rib or wall member 92 forms part of the side of both a cell 94, and one or more of cells 89, 90 and 91.

Continuous lip members 95 which are present around the periphery of the openings of each cell 89, 90, 91 and 94 are more pronounced around the circular peripheries of cells 90, 91 and 94 than around the rectangular periphery of cells 89.

Cells 89, 90, 91 and 94 are generally all of the same height but their volumes are of the order of 91 < 90 < 89 < 94, and the relative size of the volumes of such cells is a function of the relative size of perforations 75, 74, 73 and 2, respectively. Cells 89, 90 and 91 tend to be conical in shape, then cells 94, whereas cells 94 tend to be more cylindrical in shape than cells 89, 90 and 91. The sealed ends of all of these cells, however, tend to be narrower than the open ends thereof.

During the expansion step in the process the resulting voids 89, 90, 91 and 94 are vented through the perforations 73, 74, 75 and 2 respectively in the upper and lower mold plates, and also through the imperfect seal that exists between the surfaces of such mold plates and the surfaces of the upper and lower platens of the press to which the mold plates are affixed during the expansion process.

As seen in FIG. 29 the openings of upper cells 89, 90 and 91 are not aligned, in the vertical plane, with the openings of lower cells 94. Thus each of lower cells 94 are generally overlapped, in the vertical plane, by two or three cells 89, 90 and/or 91. This pattern of overlap in the cell openings, as seen in FIG. 29, is a replication of the pattern of overlap, in the vertical plane of the perforations in the faces of the two mold plates 72 and 1 which were used as the upper and lower mold plates, respectively, during the preparation of expanded blank 86.

It can also be seen that about one-half of all the cells in the blank 86 are cells 94 which are open at the lower face of expanded blank 86, and that the remaining cells are cells 89, 90 and 91 which are open at the upper face of blank 86.

The amount of pressure used to pull the plates of the press apart in the process of the present invention is about 1 to 10 pounds per square inch of continuous surface area on the blank contact surface of the plates.

In all of the embodiments of the present invention shown above, the blank is expanded between the perforated mold plates while the blank is heated to a temperature which is ≥ the Ta of the thermoplastic material in the blank, and while the blank is bonded to the non-perforated contact surface areas of the mold plates by hot tack adhesion. The pattern of the voids or cells in the resulting expanded blanks is thus in response to the pattern of contact between the contacting surfaces of the blank and the mold plates. Venting of the resulting cells during the expansion step so as to equilibrate the pressure within the cells with the pressure without the blank maintains the uniformity and integrity of the configuration of the resulting cross-sectional geometry of the expanded blank.

Thus, the process involved in preparing the expanded blanks shown in the drawings, which have an expanded cross-sectional geometry, which geometry comprises a plurality of cells separated by expanded ribs, by expanding a blank of material having a Ta between a pair of perforated mold plates, and wherein the perforated surface of each of the mold plates has non-perforated surface area for contacting the blank, and the blank has two contacting surfaces, such as a sheet of plastic, could be more specifically described in a sequence of steps which comprises:

positioning the two mold plates with respect to each other so that the perforations in each plate face each other and are non-aligned, inserting the blank between the perforated surfaces of the mold plates while the blank is heated to a temperature which is ≥ the Ta of the blank, bringing the mold plates and the blank into contact at the contacting surfaces thereof while the blank is at said temperature of ≥ Ta so as to effect hot tack adhesion between the contacting surfaces, expanding the distance between the mold plates with the blank thus adhesively bonded thereto so as to effect an expansion of the cross-section of the blank with the attendant formation within the expanded cross-section of a plurality of cells separated by expanded ribs of the material in the blank, such cells encompassing areas of reduced pressure, and the configuration of each, and of the combination of all, of the cells being in response to the pattern of contact between all of the contacting surfaces, venting the cells during the expansion so as to equilibrate the pressure within the cells with the pressure without th blank and thereby maintain the uniformity and integrity of the configuration of the resulting cross-sectional geometry, and cooling the expanded blank to a temperature below the heat distortion point of the material.

The expanded blanks, as shown in the drawings, and as described above, are seen to be integrally formed three dimensional panels. Each of these panels may be more specifically defined as having a near side and a far side, with the cross-section of the panel comprising a plurality of tapered cells wherein each of such tapered cells is open at its wider end and sealed at its narrow end, and wherein approximately one half of such cells have their open ends facing out from one side, near or far, of the panel, and the remainder of the cells have their open ends facing out from the other side of the panel. Each of the tapered cells comprises a plurality of tapered wall members, and each of the tapered wall members of each cell facing out from the one side of the panel are shared in common with a cell facing out from the other side of the panel. Each cell has three or more wall members. Each of the faces of the near side and the far side of the panel replicates the surface of the perforated plate to which such sides were attached or bonded during the expansion or forming step in the process of the present invention. The continuous surfaced areas of the surfaces of one side (near or far) of the panel forms the bases, or narrow tapered sealed ends of the cells which are open on the other side of the panels. Further, the sealed base member of the tapered end of each cell one one side, near or far, of the panel, forms a portion of the periphery of the wide end of at least two of the cells on the other side of the panel. Thus, the walls of the cell facing out from one side of the panel are all shared in common with the walls of a plurality of cells facing out from the other side of the panel.

The perforations in the mold plates can be so provided that the same, or different, sized and/or shaped perforations can be used in each mold plate. Where the perforations in both mold plates are of the same size and shape, and the mold plates are pulled apart a uniform distance, the resulting cells in the expanded blank will be of uniform height and volume. Cells of different volume can be provided in the one panel by using mold plates having different sized or shaped perforations therein and/or by pulling the two mold plates apart a non-uniform distance.

The expanded plastic objects made in accordance with the present invention are lightweight panels that may be rigid or flexible depending on the plastic used therein, and the degree to which the plastic is expanded. Additional rigidity may be supplied by bonding the expanded plastic member to one or more rigid lamina. The expanded plastics may be used, with or without other lamina bonded thereto, as structural elements for containers, walls, partitions, lath, packaging and other applications where light weight structural elements are used.

For most of the end use applications it is desirable, as noted above, to so expand the blank so that the integrity of the I-beam shaped wall members that separate the cells in the expanded blank is maintained. That is, the vacuums that arise in these cells are vented to avoid rupturing such wall members. For some applications, however, it may be desirable to intentionally cause a rupturing of such wall members. This can be accomplished, even while venting the vacuums in the cells, by continuing to expand the blank to such an extent that the wall members become thinner and thinner and eventually rupture, leaving punctures therein. The punctures can thus be provided uniformly in one or more of the wall members in all of the cells. The expanded blanks made with such ruptured wall members can be used to allow the passage of liquids or gases there through in various applications, such as screens, trickle-tower filling and air vents.

THE THERMOFORMABLE MATERIALS

The materials which may be employed as the blanks in the present invention are normally solid thermoformable materials which have a Ta of about 50° to 300°C., and preferably of about 100° to 250°C.

If there is a difference of at least about 10°C. between the melting points of any two fusible materials that could be used as the mold plates, then the fusible material having the lower melting point could be used as a blank while the fusible material having the higher melting point could be used as the mold plate.

The blanks may be used in various forms such as sheet, netting and sheet with punched out designs. The fusible material used for the blank need not have any elastomeric qualities.

Fusible materials which might be used as blanks would include natural and synthetic thermoplastic resins and thermosetting resins, glass and low melting elemental metals and alloys and compounds thereof.

The natural resins would include materials such as asphalt, bitumen, gums, pitch and tar.

The synthetic resins would include the vinyl resins. These vinyl resins may be either homopolymers of an individual vinyl monomer or they may be inter polymers of one or more vinyl monomer and from 0 to about 50 mol per cent of one or more nonvinyl monomers which are interpolymerizable with vinyl monomers. The term "vinyl monomer" means a compound which contains at least one polymerizable group of the formula

Such vinyl monomers, therefore, would include the following: unsubstituted olefins, including mono-olefins such as ethylene, propylene, 1-butene, and isobutylene and polyolefins such as butadiene, isoprene, dicyclopentadiene and norbornene; halogenated olefins such as chloroprene, tetrafluoroethylene, chlorotrifluoroethylene, hexafluoropropylene; vinyl aryls such as styrene, o-methoxystyrene, p-methoxystyrene, m-methoxystyrene, o-nitrostyrene, p-nitrostyrene, p-phenylstyrene, o-phenylstyrene, m-phenylstyrene, vinylnaphthalene and the like; vinyl and vinylidene halides, such as vinyl chloride, vinyl fluoride, vinylidene chloride, vinylidene fluoride, vinylidene bromide and the like; vinyl esters such as vinyl formate, vinyl acetate, vinyl propionate, vinyl butyrate, vinyl chloroacetate, vinyl chloropropionate, vinyl benzoate, vinyl chlorobenzoate and the like; acrylic and alpha-alkyl acrylic acids, their alkyl esters, their amides and their nitriles such as acrylic acid, chloroacrylic acid, methacrylic acid, ethacrylic acid, methyl acrylate, ethyl acrylate, butyl acrylate, n-octyl acrylate, 2-ethylhexyl acrylate, n-decyl acrylate, methyl methacrylate, butyl methacrylate, methyl ethacrylate, ethyl ethacrylate, acrylamide, N-methyl acrylamide, N,N-dimethyl acrylamide, methacrylamide, N-methyl methacrylamide, N,N-dimethyl methacrylamide, acrylonitrile, chloroacrylonitrile, methacrylonitrile, ethacrylonitrile, and the like; maleic and fumaric acid and their anhydrides and alkyl esters such as maleic anhydride, dimethyl maleate, diethyl maleate and the like; vinyl alkyl esters and ketones such as vinyl methyl ether, vinyl ether, vinyl isobutyl ether, 2-chloroethyl vinyl ether, methyl vinyl ketone, ethyl vinyl ketone, isobutyl vinyl ketone and the like; also vinyl pyridine, N-vinyl carbazole, N-vinyl pyrrolidone, ethyl methylene malonate, acrolein, vinyl alcohol, vinyl acetal, vinyl butyral and the like. Non-vinyl monomers which may be interpolymerizable with vinyl monomers include carbon monoxide and formaldehyde.

The vinyl polymers would thus include, for example, polyethylene, polypropylene, ethylene-propylene copolymers, polyvinyl chloride, polyvinylidene chloride, polyvinyl fluoride, polystyrene, styrene-butadieneacrylonitrile terpolymers, ethylene-vinyl-acetate copolymers, ethylene-acrylic acid copolymers, ethyleneacrylonitrile copolymers and styrene-acrylonitrile copolymers.

In addition to the vinyl polymers, other polymeric materials which may be used in accordance with the present invention include thermoplastic polyurethane resins; polyamide resins, such as the nylon resins, including polyhexamethylene adipamide; polysulfone resins; polycarbonate resins; phenoxy resins; polyacetal resins; polyalkylene oxide resins such as polyethylene oxide and polypropylene oxide; polyphenylene oxide resins; and cellulose ester resins such as cellulose nitrate, cellulose acetate and cellulose propionate.

Also included within the term "polymer" are blends of two or more polymeric materials. Illustrative of such blends are polyethylene/polypropylene; low density polyethylene/high density polyethylene; polyethylene with olefin interpolymers such as those indicated above, for example, ethylene-acrylic acid copolymers, ethylene-ethyl methacrylate copolymers, ethylene-ethylacrylate copolymers, ethylene-vinyl acetate copolymers, ethylene-acrylic acid-ethylacrylate terpolymers, ethylene-acrylic acid-vinylacetate terpolymers, and the like.

Also included within the term "polymer" are the metallic salts of those polymers or blends thereof which contain free carboxylic acid groups. Illustrative of such polymers are ethylene-methacrylic acid copolymers, ethylene-ethacrylic acid copolymers, styrene-acrylic acid copolymers, butene-acrylic acid copolymers, and the like.

Illustrative of the metals which may be used to provide the salts of such carboxylic acid polymers are the 1,2, and 3 valent metals such as sodium, lithium, potassium, calcium, magnesium, aluminum, barium, zinc, zirconium, beryllium, iron, nickel, cobalt, and the like.

The polymers from which the blanks are shaped may be used in any of the forms in which they are commonly employed in the molding arts such as in the form of powder, pellets, granules and the like, and blends of the same with one or more adjuvant materials. Such adjuvant materials would include materials such as plasticizers, heat and light stabilizers, fillers, pigments, processing acids, extenders, fibrous reinforcing agents, impact improvers and metal, carbon and glass fibers and particles.

The particular polymeric material being used would dictate the selection and quantity of the adjuvants to be employed therewith, since it is the respective adjuvants for such polymers that are employed in the present invention. The adjuvants employed must be physically and chemically compatible with each of the other components of the compositions under the described operating conditions. The adjuvants are used in amounts which will be effective for the intended purpose. Thus, for example, the effective amount of plasticizer is a "plasticizing amount," that is, an amount of plasticizer which will appreciably increase the flexibility, processability, workability and/or distensibility of the polymer. The stablizers would be used in a stabilizingly effective quantity, and the fillers would be used in effective quantities therefor, as for example, if a reinforcing filler is to be used then the filler would be used in such amounts as to provide the desired reinforcing effect.

The polymer based compositions employed in the present invention may be prepared by any of the commonly employed techniques employed for compounding such compositions. Such procedures would include techniques such as dry blending or hot compounding, as well as with or without the use of mixing equipment such as ribbon blenders, muller blenders, intensive mixer blenders, extruders, banbury mixers and the like.

Although metallic materials of construction are usually only used as the mold plates in the process of the present invention, it is possible that expanded blanks of the present invention can also be made wherein a low melting metal, or alloy or compound thereof, can be used as the blank with mold plates made from nonfusible materials, or materials having higher fusion points than such low melting metallic materials.

THE MOLD PLATES

The two perforated mold plates used to pull the blank apart can be made of the same or different materials. The mold plates may also be porous or non-porous, planar or non-planar and matching.

During the molding operation it is desirable as noted above, to vent the interior portions of the blanks which are being pulled apart. The need for venting the blanks being expanded, as noted above, arises due to the fact that a vacuum is created within the interior sections of the blank by virtue of the increase of the volume of such interior portions during the expansion operation. If the blank is not vented during the expansion operation, atmospheric pressure could cause puncture of the extended rib sections of the expanded blank during the expansion operation. This venting of the expanded blank can also be accomplished by using porous mold plates.

The materials from which the mold plates may be fabricated are normally solid materials which are either not fusible at the operating temperatures or which have a melting point which is at least 10°C. higher than the melting point of the fusible material from which the blank is fabricated.

Non-fusible materials which may be used for the mold plates would include cellulosic materials such as wood, paper, cardboard and compressed sawdust; thermoset or vulcanized compositions based on natural or synthetic resins; minerals such as graphite, clay and quartz; natural rock and stone materials such as marble and slate; building materials such as brick, tile, wallboard and concrete; and proteinaceous materials such as leather and hides.

Fusible materials having a relatively high Tg or Tm which dould be used as the mold plates would include metals such as aluminum, iron, lead, nickel, magnesium, copper, silver and tin, as well as alloys and compounds of such metals, such as steel, brass and bronze; vitreous materials such as glass, ceramics and porcelain; and thermoplastic resins having a relatively very high fusion point, such as the so-called engineering plastics, such as polytetrafluoroethylene, nylon-6 resins, polyacetal resins, polyvinylidene fluoride, polyesters and polyvinyl fluoride; or fusible materials coated with polytetrafluoroethylene.

The use of mold release agents such as silicone oils and fluorocarbon oils, or the use of mold plates made of materials having a low surface energy such as polytetrafluoroethylene, will insure the separation of the cooled expanded blank from the mold plates after the expansion operation, when the cooled expanded blank would not otherwise readily separate from the mold plates.

For various applications it may be desirable to promote the adhesion of the expanded blank to the mold plates, as in the formation of laminates. Certain compounds can be used as adhesion promoters for such purposes. The preferred of these adhesion promoters are various organosilicon compounds. These adhesion promoters may be used as primers and applied to the surfaces of the laminae substrates in layers which are at least monomolecular in depth. The adhesion promotors may also be incorporated or admixed in with the components of the blank. In the latter case, the adhesion promoter is added to the blank in an amount of about 0.00001 to 5.0 per cent by weight based on the weight of the blank.

When the organo-silicon compound is to be used as a primer or incorporated into the blank, it may be used in the form of a solution in an organic solvent such as an alcohol, an ester, a ketone, an aromatic or aliphatic hydrocarbon, a halogenated hydrocarbon, or mixtures of such solvents.

Examples of the organo-silicon compounds which may be used include silyl peroxide compounds, alkoxy silanes, amino-alkoxy silanes, vinyl alkoxy silanes and amino-alkylalkoxy silanes.

The silyl peroxide compounds may be in the form of a monomer of polymer, e.g., silane or siloxane. They may, in fact, be any silicon-containing compound which contains an organo-peroxy group bonded to silicon, which organo moiety is bonded to the peroxy oxygen and thence to the silicon by a non-carbonyl carbon atom.

These silyl peroxides can be made pursuant to the processes described in U.S. Pat. No. 3,631,161 and Canadian Pat. No. 924,230.

Specific examples of such silyl peroxide compounds are vinyl tris(t-butylperoxy)silane, allyl tris(t-butylperoxy)silane, tetratris(t-butylperoxy)silane, allyl(t-butylperoxy)tetrasiloxane, vinyl methyl bis(t-butylperoxy)silane, vinyl tris($\alpha,\alpha$-dimethyl benzylperoxy)silane, allyl methyl bis(t-butylperoxy) silane, methyl tris(t-butylperoxy)silane, dimethyl bis(t-butylperoxy)silane, isocycnatopropyl tris(t-butylperoxy)silane and vinyl diacetoxy(t-butylperoxy) silane.

The amino alkyl alkoxy silanes would include those having the structure:

wherein X is alkoxy, aroxy or acryloxy; R is divalent alkylene of 3-8 carbon atoms with at least 3 sequential carbon atoms separating N from Si; at least one of R' and R'' is hydrogen, and any remaining R' or R'' is alkyl, $HO+CH_2CH_2(O)_{x+1-5}$ where $x$ is 0 or 1, $H_2NCO-$, $H_2NCH_2CH_2$, and $H_2NCH_2CH_2NHCH_2CH_2$.

Examples of such aminoalkyl-alkoxy silanes would include gamma aminopropyltriethoxy silane, gamma-aminopropyltrimethoxy silane, bis(beta-hydroxy methyl) gamma-aminopropyl triethoxy silane and N-beta-(aminoethyl)gamma-aminopropyl triethoxy silane.

As noted above, one or both of the surfaces of the plates which are used to adhere to, and pull and expand the blank of plastic, may be an integral part of the press platens or molding device. One or both of the mold plates may also be removably mountable on the platen or molding device. The use of the removable type of mold plate is preferable where the mold plates are to be perforated or porous, so as to effect the venting therethrough, or where laminates are to be formed.

The following examples are merely illustrative of the present invention and are not intended as a limitation upon the scope thereof.

The press used in these examples was a spring loaded Carver press, as shown in FIGS. 4 to 6 of the drawings. Two springs were used in the press and each had a deflection of 130 pounds per inch, and the springs were designed to mechanically pull the platens apart, as explained above with reference to FIGS. 4 to 6, at a predetermined rate, as regulated by a needle valve on the hydraulic ram of the press. The platens of the press were 6 × 6 and were malleable cast iron and could be cooled by conduction, as desired, by the circulation of cold water therethrough. The platens of the press could also be heated by conduction, as desired, by heating platens 5A and 5B electrically. Mold plate 1 is usually heated conductively through upper platen 5A. The temperature of the surfaces of both the heated platens and the mold plates was measured with a thermocoupled pyrometer.

EXAMPLE 1

This example discloses the preparation of an expanded article as shown in FIGS. 1 to 9 of the drawings. Perforated aluminum plates ⅛"×6"×6" and having, as the perforations therein, regularly spaced holed measuring about ¾ inch in diameter were prepared. The holes were placed in aligned rows and columns in the plates, as shown in FIG. 1, with each hole spaced about 3/16 inch from the next adjacent hole. One of the perforated plates was then attached to each of the platens of a Carver press so that the two perforated plates provided the overlap pattern for the perforations in the plates as shown in FIG. 3 of the drawings. The perforated plates were thus positioned on the faces of the top and bottom platens of the press so that the opening of each perforation of the upper perforated plate overlapped three of the perforations in the lower perforated metal plate. A 6"×6"×60 mil sheet of polyethylene (having a density of 0.96, a melt index of 3, a Tm of 130°–140°C. and a Ta of about 135°–140°C) was then inserted between the perforated metal mold surfaces which were heated to 180°C. The press was then closed to slightly compress the sheet of plastic and to effect hot tack adhesion between the sheet of plastic and the contact surfaces of the perforated plates as shown in FIG. 5. The temperature of the platens and the metal mold surfaces was allowed to equilibrate at 140°C. and then the press was opened to expand the plastic to a thickness of ¾ inch. During the expansion step the resulting voids in the expanding plastic were vented through the perforations in the metal plates and through the interface between the perforated plates and the platens of the press. The expanded plastic was then cooled and it then was readily separated from the perforated metal plates. The expanded sheet had the configuration of the article shown in FIGS. 7 to 9 of the drawings. The perforated areas of the metal plates were reproduced as open cells (8 and 11 in FIG. 7) in the expanded sheet of resin, with the solid portions of the faces of the perforated plates being duplicated as solid flanges on the top and bottom faces of the expanded article and joined by webs of plastic through the cross-section of the expanded sheet. The cells were all of uniform volume and height. The panel was rigid.

EXAMPLE 2

This example discloses the preparation of an expanded article as shown in FIGS. 10–12 of the drawings. The mold plates used were 52 mil thick sheets of expanded steel mesh as shown in FIG. 10. The diamond shaped pattern of the mesh had ⅜ inch by 1 inch perforations with a 115 mil face width for the flat metal mesh strand. A 6"×6" sheet of the mesh plate was fastened face to face to a sintered stainless steel porous plate. Two of such assemblies were made, one of which was attached to the face of the upper platen, and the other of which was attached to the lower platen, of the Carver press so that the porous plate in each case was adjacent the contact face of a platen of the press. The surfaces of the expanded mesh were then in a position to contact the blanks that were inserted in the press. The faces of the two metal mesh platens were also so arranged that the diamond shaped openings in the metal mesh plates faced each other at right angles, that is, one of the expanded metal mesh surfaces was turned at an angle of 90° to the other. A 60 mil thick sheet of the polyethylene of Example 1 was placed between the expanded mesh mold surfaces heated to a temperature of 180°C. The press was then closed to slightly compress the sheet of plastic and to effect hot tack adhesion between the sheet of plastic and the metal mesh mold surfaces. When the sheet of plastic then changed to a clear glossy state, the press was open so as to expand the sheet of plastic 5.4 times its original thickness. The resulting voids in the expanding sheet were vented through the perforations in the metal mesh mold surfaces and through the porous metal plates attached thereto. The expanded sheet was then cooled and it readily separated from the platens. It was rigid and lightweight and had the configuration shown in FIGS. 11 to 12 of the drawings.

EXAMPLE 3

Using the procedure of Example 2 a 60 mil thick sheet of polypropylene was inserted into the press at 195°C. and expanded at 170°C. When the expanded sheet was cooled it readily separated from the mold surfaces and had the configuration of the expanded article shown in FIGS. 11 to 12 of the drawings. The expanded plastic was 1 inch thick and weighed 3 pounds per square yard. The polypropylene resin used had a Tm of 165°–175°C., a Ta of 170°C., a density of 0.905 and a melt index of 5.

EXAMPLE 4

Using the procedure of Example 3 a 60 mil thick sheet of a thermoplastic polyester polyurethane which had a Ta of 160°–180°C. was inserted into the press at 200°C. and expanded at 175°C. to 4 times its original thickness. When the expanded sheet was cooled it readily separated from the mold surfaces and had the configuration of the expanded article shown in FIGS. 11 to 12 of the drawings. The sheet of expanded plastic was resilient and useful as a cushion pad, rug cushioning or automotive padding.

EXAMPLE 5

This example discloses the preparation of an expanded blank as shown in FIG. 13.

A 52 mil thick expanded steel mesh, as shown in FIG. 10, was mechanically fastened to each of the platens of a Carver press. The diamond shaped pattern of the mesh had ⅜ by 1 inch openings with a 115 mil face width for the flat metal mesh strand. A 6"×6" smooth surfaced sheet of polyethylene (having a density of 0.96, a melt index of 3; a Tm of 130°–140°C. and a Ta of about 135°–140°C.) which was 120 mils thick was coated with a solution, in toluene, of a silyl peroxide adhesion promoter, vinyl tris(t-butyl peroxy) silane, on both surfaces of the sheet so as to provide such surfaces, after the evaporation of the toluene, with a coating of about 2 milligrams of the silyl peroxide per square inch of surface area. The thus coated sheet was placed in the press, as shown in FIG. 4, after the mesh platens had been heated to a temperature of 185°C. The platens of the press were then closed so as to subject the blank (the peroxide coated sheet) to a pressure to 10 psi, as shown in FIG. 5. The polymer in the blank fused and wet and adhered to the steel mesh mold plates. The temperature throughout the mold plates and the platens of the press were allowed to equilibrate and the temperature thereof dropped to 135°C. Then the mold plates were separated as shown in FIG. 6, at a velocity of 1000 mils/15 seconds, and then cooled to about 125°C. Venting of the blank was done through the mesh of the mold plates and between the contacting surfaces of the platens of the press and the mesh plates. The normal contacting surfaces of the platens of the press and the mesh plates were rough enough so as to allow sufficient venting therebetween.

The expanded sheet, with the mesh plates adhered thereto, was removed from the press. The resulting composite structure, shown in FIG. 13, was ¾ inch thick. The rib members of the expanded core of plastic were regularly spaced and firmly bonded to the mesh plates. A portion of the mesh surface of the composite, about 1 inch in diameter, was subject to a blow of 150 foot pounds which deformed the mesh plates and the expanded core, but did not cause adhesive delamination of the expanded core from the mesh plates. The resultant expanded laminate was a structural core embodying two mesh skins suitable for an automobile dashboard or other portions thereof.

EXAMPLE 6

The procedure of Example 5 was followed except that the blank used was a sheet of a blend of polysulfone and silicone block copolymer. The sheet had a Tg of 180°C. and a Ta of about 300°C. The surfaces of the metal mesh plates that were to contact the blank were primed with a 5% solution of polysulfone in methylene chloride (as an adhesion promoter) and dried for 10 minutes at 275°C. prior to fastening the plates to the platens of the press.

The blank was fused between the mold plates in the press, at 375°C. and expanded at 340°C. When cooled and removed from the press the expanded blank was firmly bonded to both of the mesh plates. The expanded composite was about one inch thick and had regular spaced ribbing as shown in FIG. 13. This composite expanded blank could be used as a structural member in furniture frames, interior automotive framing and the like.

EXAMPLE 7

The procedure of Example 5 was followed using a 60 mil thick sheet of the same high density polyethylene as was used in Example 5. The sheet of plastic, however, was not treated with the silyl peroxide adhesion promoter. The mesh mold plates were heated to 180°C. before the sheet of plastic was inserted therebetween. The sheet was then expanded about 5.4 times its original thickness. When then removed from the press and cooled to 125°C., the expanded plastic readily separated from the mesh plates, was light weight and rigid, and had the configuration of the expanded core member 32 shown in FIG. 13 with regular rib spacing.

EXAMPLE 8

This Example discloses the preparation of an expanded Article 51 as shown in FIGS. 17–18 of the drawings. The mold plates used were those shown in FIGS. 14–16. The mold plates measured 6 × 6 inch. The hexagonal perforations were placed in aligned and staggered rows and columns as shown in FIG. 14, with each perforation spaced about 3/32 of an inch from the next adjacent perforation. One of the perforated plates was then attached to each of the platens of a Carver press so that the two plates provided the overlap pattern shown, in replication, in the expanded blank of FIG. 17. A 6 × 6 inch × 60 mil sheet of the polyethylene of Example 1 was then inserted between the perforated metal mold surfaces which were heated to 180°C. The press was then closed to slightly compress the sheet of plastic and to effect hot tack adhesion between the sheet of plastic and the contact surfaces of the perforated plates. The temperature of the platens and the metal mold surfaces was allowed to equilibrate at 145°C. and then the press was opened to expand the plastic to a thickness of 0.720 inch. During the expansion step the resulting voids in the expanding plastic were vented, in turn, through perforations 45, vent holes 46, channels 46A, and the open wall of U-shaped frame 49 as discussed above. The expanded plastic was then cooled and it then was readily separated from the perforated metal plates. The expanded sheet had the configuration of the article shown in FIGS. 17 to 18 of the drawings. The perforated areas of the metal plates were reproduced as open cells (54 and 55 in FIG. 18) in the expanded sheet of resin, with the solid portions of the faces of the perforated plates being duplicated as solid flanges on the top and bottom faces of the expanded article joined by webs of plastic through the cross-section of the expanded sheet. The cells were all of uniform volume and height. The panel was rigid and useful as a disposable shipping pallet.

EXAMPLES 9–20

Blanks in the form of 6 × 6 inch plaques, of different thermoplastic materials were expanded as in Example 8 to produce expanded articles 51 as depicted in FIGS. 17–18 of the drawings, using the mold plate shown in FIGS. 14–16. The blanks were of various initial thicknesses, and they were expanded to various heights. Table I below lists a. the polymeric material used in each plaque,
b. the Ta of each polymeric material, in °C.,
c. the initial thickness, in mils of the plaque when it was inserted in the press,
d. the temperature of the platens and mold plates when the plaque was inserted in the press,
e. the temperature of the platens, the mold plates and the plaque at the start of the expansion step in the process,
f. the rate of speed, in mils/second, at which the mold plates were separated during the expansion step, and
g. the final thickness of the expanded blank, in mils,
h. comments on the flexibility or rigidity, and on the clarity or color of the resulting expanded blank.

The plaque of ABS resin used in Example 9 contained about 10% by weight of rubber impact modifier.

The plaque of polyvinyl chloride used in Example 20 was annealed at 145°C. for 2 hours to remove stresses therefrom prior to insertion in the press.

During the expansion process the blanks were expanded at the rate of about 15–20 mils per second.

TABLE I

| Example | Polymer | Ta-°C. | Initial Thickness, mils | Insertion Temperature °C. | Expansion Temperature °C. | Expansion Speed mil/sec | Expanded Thickness mils | Comments |
|---|---|---|---|---|---|---|---|---|
| 9 | Acrylonitrile-butadiene-styrene terpolymer | 180 | 80 | 220 | 210 | 10 | 960 | opaque, rigid |
| 10 | polymethyl-methacrylate | 160 | 130 | 210 | 190 | 15 | 1820 | clear, rigid |
| 11 | polystyrene (rigid) | 185 | 100 | 200 | 185 | 15 | 1000 | clear, rigid |
| 12 | polystyrene (rigid) | 185 | 60 | 195 | 185 | 15 | 600 | clear, rigid |
| 13 | hydroxy propyl cellulose | 110 | 100 | 160 | 140 | 10 | 800 | translucent, rigid, water soluble |
| 14 | polypropylene | 170 | 60 | 220 | 200 | 10 | 600 | opaque, rigid |
| 15 | styrene-acrylonitrile copolymer | 190 | 100 | 220 | 190 | 15 | 1000 | clear, rigid |
| 16 | ethylene-ethyl acrylate copolymer | 110 | 130 | 130 | 115 | 10 | 1300 | translucent, flexible |
| 17 | polyethylene, 0.917 density; 2.0 melt index | 120 | 60 | 160 | 140 | 15 | 500 | opaque, flexible |
| 18 | polyphenylene oxide-polystyrene blend | 235 | 75 | 250 | 235 | 10 | 500 | black, opaque rigid |
| 19 | Nylon-6 (rigid) | 240 | 60 | 250 | 240 | 15 | 750 | opaque, rigid |
| 20 | polyvinyl chloride | 155 | 100 | 200 | 180 | 10 | 1250 | clear, rigid |

Note: The composition used in Example 18 comprised 4% by weight of carbon black and 96% by weight of a 25/75 weight % blend of polyphenylene oxide and polystyrene.

EXAMPLE 21

This Example discloses the preparation of an expanded article 58 as shown in FIGS. 19–20 of the drawings. The mold plates used were those shown in FIGS. 14–16. One of the perforated plates was attached to each of the platens of a Carver press so that the two plates provided the overlap pattern shown, in replication, in the expanded blank of FIG. 19. A 6 × 6 inch × 100 mil sheet of the polyethylene of Example 1 was then inserted between the perforated metal mold surfaces which were heated to 180°C. The press was then closed to slightly compress the sheet of plastic and to effect hot tack adhesion between the sheet of plastic and the contact surfaces of the perforated plates. The temperature of the platens and the metal mold surfaces was allowed to equilibrate at 140°C. and then the press was opened to expand the plastic to a thickness of 1 inch. During the expansion step the resulting voids in the expanding plastic were vented, in turn, through perforations 45, vent holes 46, channels 46A, and the open wall of U-shaped frame 49 as discussed above. The expanded plastic was then cooled and it then was readily separated from the perforated metal plates. The expanded sheet had the configuration of the article shown in FIGS. 19 to 20 of the drawings. The perforated areas of the metal plates were reproduced as open cells (61 and 62 in FIG. 20) in the expanded sheet or resin, with the solid portions of the faces of the perforated plates being duplicated as solid flanges on the top and bottom faces of the expanded article joined by webs of plastic through the cross-section of the expanded sheet. The cells, were all of uniform volume and height. The panel was rigid and useful as an impact absorbant shield in the door structure of an automobile.

EXAMPLE 22

This Example discloses the preparation of an expanded article 65 as shown in FIGS. 21–22 of the drawings. The mold plates used were those shown in FIGS. 14–16. One of the perforated plates was attached to each of the platens of a Carver press so that the two plates provided the overlap pattern shown, in replication, in the expanded blank of FIG. 21. A 6 × 6 inch × 100 mil sheet of the polyethylene of Example 1 was then inserted between the perforated metal mold surfaces which were heated to 210°C. The press was then closed to slightly compress the sheet of plastic and to effect hot tack adhesion between the sheet of plastic and the contact surfaces of the perforated plates. The temperature of the platens and the metal mold surfaces was allowed to equilibrate at 190°C. and then the press was opened to expand the plastic to a thickness of 1¼ inches. During the expansion step the resulting voids in the expanding plastic were vented in turn through perforations 45, vent holes 46, channels 46A, and the open wall of U-shaped frame 49 as discussed above. The expanded plastic was then cooled and it then was readily separated from the perforated metal plates. The expanded sheet had the configuration of the article shown in FIGS. 21 to 22 of the drawings. The perforated areas of the metal plates were reproduced as open cells (65 and 69 in FIG. 20) in the expanded sheet of resin, with the solid portions of the faces of the perforated plates being duplicated as solid flanges on the top and bottom faces of the expanded article joined by webs of plastic through the cross-section of the expanded sheet. The cells were all of uniform volume and height. The panel was rigid and useful as an interior wall panel core structure having rigid skin lamina of 1/6 inch melamine phenolic resin bonded thereto by contact adhesives.

EXAMPLE 23

This example discloses the preparation of an expanded article 76 as shown in FIGS. 25–27 of the drawings. The mold plates used were those shown and aligned as mold plates 1 and 72 in FIG. 24.

The resin expanded was a 75 mil thick sheet (6 × 6 inch) of acylonitrile-butadiene-styrene terpolymer which had a Ta of 180°C.

Mold plate 1 was the same as in Example 1, and mold plate 72 was a 6 × 6 × ⅛ inch aluminum sheet. ½

The small holes 75 of mold plate 72 had a diameter of ⅜ inch, the larger holes 74 had a diameter of ½ inch and the square holes 73 measured ½ × ½ inch. All of these perforations in mold plate 72 were positioned one inch from the center of the next adjacent perforation, in each diagonal alignment of such perforations, and the centers of all of the perforations were aligned in each vertical column and horizontal row thereof. As shown in FIG. 23, the square holes were ½ inch from each other in the vertical columns thereof and ⅜ inch from each other in the horizontal rows thereof. The large circular holes or perforations were positioned 7/16 inch from each other, and from the square perforations, in the vertical columns thereof. The small circular holes or perforations were positioned ⅝ inch from each other, and from the square perforations, in the vertical columns thereof.

The two mold plates were fastened to the upper and lower platens of a Carver press in the alignment shown in FIG. 24 of the drawings. The platens and the mold plates were then heated to 220°C. and the blank of terpolymer resin was inserted between the mold plates. The plates were closed on the blank to slightly compress it, and when the termperature of the press equilibrated at 205°C. the blank was expanded at the rate of 15 mil/second to an expanded height of 875 mils. The expanded blank was cream colored, opaque, and rigid, and had the configuration of the expanded blank 76 shown in FIGS. 25–27 of the drawings.

EXAMPLE 24

This example discloses the preparation of an expanded article as shown in FIGS. 29–31 of the drawings. The resin and the two mold plates employed were those used in Example 23. The two mold plates were fastened to the upper and lower platens of a Carver press in the alignment thereof shown in FIG. 28 of the drawings. A 75 mil thick sheet of the resin was expanded as in Example 23 to an expanded height of 1150 mils. The expanded blank was cream colored, opaque, and rigid, and had the configuration of the expanded blank 86 shown in FIGS. 29–31 of the drawings.

EXAMPLE 25

This example illustrates the use of negative perforation means. A 10 mil thick sheet of aluminum was perforated with a series of ¾ inch holes to produce a punched out sheet having the configuration of mold plate 1 as shown in FIG. 1. The ¾ inch holes were aligned in staggered rows and columns as shown in FIG. 1, and were spaced about 3/16 inch from the next adjacent hole. This perforated aluminum sheet was then placed over the surface of a 65 mil thick sheet (6 × 6 inch) of impact grade styrene which had a Ta of 180°C. A release paint made of 75% by weight of white clay (−200 mesh), 5% by weight of toluene and 20% by weight of ethyl alcohol was used to paint the circular portions of the polystyrene sheet that were exposed through the circular perforations in the aluminum mask, so that a pattern of circular discs of the release paint remained, upon subsequent removal of the aluminum mask, The thus treated plaque of polystyrene was then dried in an oven at 75° C. for 10 minutes and cooled. A similar pattern of circular discs of release paint was then applied to the other side of the plaque of resin, in the same manner. The pattern of the circular discs was applied to the two opposite faces of the plaque of resin so that when the plaque was laid flat on one such side, the pattern of the circular discs on each of the two faces of the plaque overlapped, in the vertical plane, three of the circular discs in the other face of the plaque. This pattern of overlap was similar to that provided by the two mold plates of FIG. 3 of the drawings.

The dried plaque was then inserted into a Carver Press between an upper and a lower aluminum mold plate which were affixed to the upper and lower platens, respectively of the press. Each of these two mold plates has a series of small vent holes drilled (No. 60 drill, ½ inch on centers) through the plates. The vent holes were so positioned on the mold plates, and the plaque of polystyrene was so positioned between the mold plates, that at least one such vent hole was adjacent each of the circular discs of release paint on each side of the plaque at the interfaces between the plaque and the two mold plates. The plaque of resin was inserted into the press while the platens and the mold plates were at a temperature of 210°C., and the plaque was expanded at the rate of about 15 mils/second, at 200°C., to an expanded height of 500 mils.

During the expansion step in the process voids or cells of reduced pressure formed in the blank at the site of the circular discs of release paint, in the same way that cells 8 and 11 formed in expanded blank 7 shown in FIGS. 7 and 8. These cells adjacent the release paint were vented during the expansion step through the vent holes in the mold plates. The expanded blank was rigid and had the configuration of the expanded blank shown in FIGS. 7–9 of the drawings. The cells in the expanded blank had openings which were essentially the same diameter as that of the circular discs of release paint. After the expansion step, and the blank was cooled, the release paint adhered to the walls and bases of the cells of the expanded blank. The paint could be removed, or left on the blank, depending on the intended end use application.

EXAMPLE 26

Three plies of plastic were laminated together to form a solid composite plastic sheet about 300 mils thick. The composite sheet was formed from two outer plies of 115 mil thick sheets of thermoplastic polyester urethane having a Ta of 160°–180°C., and a single inner ply of an 85 mil thick sheet of a rigid ethylene-vinyl acetate copolymer having a Ta of 120°C. The Ta of the composite was essentially that of the outer plies of urethane polymer, 160°–180°C.

A 6 × 6 inch sheet of the composite was inserted in a Carver press having a pair of mold plates aligned therein as shown in FIG. 3, and expanded as in Example 1. The insertion temperature was 215°C. When the temperature of the press had equilibrated to 180°C., the blank was expanded at the rate of about 15 mils/second to an expanded height of 1.00 inch. The expanded blank had the configuration shown in FIGS. 8–9 of the drawings. The blank had a rigid backbone with flexible wear resistant surfaces.

EXAMPLE 27

A 7 mil thick sheet of nylon knit mesh fabric was laminated between two plies of 60 mil thick copolymer of ethylene and the sodium salt of methacrylic acid. The composite was about 118 mils thick. The $T_a$ of the composite was 130°C., which was that of the resin.

A 6 × 6 inch sheet of the composite was inserted in a Carver press having a pair of mold plates aligned therein as shown in FIG. 3, and expanded as in Example 1. The insertion temperature was 180°C. When the temperature of the press had equilibrated to 125°C., the blank was expanded at the rate of about 15 mils/second to an expanded height of 0.500 inch. The expanded blank had the configuration shown in FIGS. 8–9 of the drawings. The blank was essentially transparent. The nylon fabric provided increased strength and rigidity.

When the expanded blank is laid on one face thereof and ¾ inch diameter steel or plastic balls are inserted in the cells of the upper face, there is produced an omnidirectional ball bearing conveyor table. The balls are free to rotate in the cells under load and are retained in the cells by the lip member around the opening of each cell.

Some rigid polymeric materials such as polysulfone resins, polycarbonate resins, and certain vinyl resins such as polyvinly chloride, tend to develop internal stresses and associated frozen-in strains when press formed into blanks. When such stresses and strains are present, it is not possible to readily use the blanks in the process of the present invention unless the blanks are first annealed to relax such stresses and strains in the blank. This annealing can be accomplished in about 0.5 to 240 minutes at temperatures ranging from the heat distortion temperature to the melting point of the resin as disclosed in U.S. patent application Ser. No. 213,432 filed Dec. 29, 1971 in the names of Walter H. Smarook and John Sonia and now abandoned.

Where the compositions used for the thermoformable blank contain fillers, the expansion temperature may have to be increased to 5° to 20°C. to compensate for the increased viscosity of the resulting compositions.

Various polymeric resins used as the expandable blanks tend to pick up moisture when exposed to the atmosphere, i.e., about 0.05 to 5.0 weight %. This moisture is preferably removed from the plastic before inserting the plastic in the hot press so as to avoid blistering or bubbling in the heated plastic. The plastics which are more susceptible to this type of moisture absorption are the polycarbonate resins, polymethylmethacrylate resins, nylon resins, cellulose acetate resins, acrylonitrile-butadiene-styrene terpolymer resins, hydroxy propyl cellulose resins, styrene-acrylonitrile copolymer resins and phenoxy resins.

For practical purposes the process of the present invention is preferably conducted under ambient conditions of pressure, i.e. atmospheric pressure. The areas, cells or voids of reduced pressure that are formed within the expanding blank during the expansion step in the process have partial vacuums therein. Thus, the level of pressure in the voids is below that of the higher level of ambient atmospheric pressure. The venting of the void areas during the expansion step is to allow these two levels of pressure to be equilibrated so as to otherwise avoid rupturing of the cell walls existing between the void areas. The partial vacuums are created in the voids areas within the blank during the expansion step in the process of the present invention because the volume of the void or cell is created and expanded within a body of plastic whose interior has no access to the ambient atmosphere other than through the venting means. The difference between the level of ambient pressure and the level of reduced pressure existing under the partial vacuum conditions in the void areas is sufficient, in the absence of such venting, to rupture the relatively thin walls of expanded thermoformable material that separate the cells of reduced pressure from each other.

The blanks are uniformly heated prior to the beginning of the expansion step in the process. This can be accomplished by heating the blanks before or after they are inserted between the platens. Where the blanks are relatively thin, i.e., of the order of ≤ 150 mils, they can be readily heated, to the $T_a$ of the thermoformable material therein, between the heated platens. The length of time needed to accomplish this will vary depending on the thickness of the blank, the $T_a$ value, and the thermal conductivity and heat capacity of the thermoformable material, and the amount of contact that exists between the surfaces of the blank and the surfaces of the platen(s). This heating can be accomplished by contact with one or both of the platens.

Where the blanks are thicker than about 150 mils, and/or have relatively high $T_a$ values, and/or will have relatively little contact with the platen surfaces, they can also be heated to a temperature which is, for crystalline materials, about 20°C. below the $T_m$ of such materials, and for amorphous materials, about 20°C below the $T_a$ of the amorphous material, before the blank is inserted between the platens, and then the blanks can be heated to the $T_a$ of the thermoformable material by being heated by contact with the platens and/or by other heating procedures such as by infrared radiation.

The cooling of the expanded blank is conducted so as to solidify or freeze, so to speak, the expanded article in its expanded configuration. This is done by cooling the article below its heat distortion point. This does not necessarily require a quenching, or quick cooling operation, unless the expanded thermoformable material is very fluid and/or has relatively thick wall members. Otherwise the cooling can be performed, in most cases, by merely exposing the expanded article to ambient air at about 25°–30°C., i.e., room temperature and/or by cooling the mold surfaces with a cooling medium, such as cold water, that is circulated through the interior of the mold plates. In some cases the cooling can also be hastened by spraying the expanded article with a spray of cool water or other cooling gas or liquid.

The $T_a$ values for a thermoformable material which are reported above were found to be, approximately, the lowest temperatures at which the related thermoformable material could be used in the process of the present invention. The reported $T_a$ values were found, initially, by a trial-and-error technique in which a heated sheet of the thermoformable material (6 × 6 inches × 100 mils) was placed between continuous sheets of aluminum (6 × 6 × 100 mils) so as to ascertain, empirically, by trial-and-error, the minimum temperature at which the process of the present invention could be conducted. The reported $T_a$ value was thus the minimum temperature at which the thermoformable material would adhere to the sheet of aluminum with sufficient force so that mechanical work applied to the molten thermoformable material, in the form of the pulling of the two sheets of aluminum apart, j produced a viscous flow in the thermoformable material without loss of adhesion to the aluminum plates, as the plates were pulled apart to a height of at least 12 times its original thickness.

These same minimum Ta valued, as determined with aluminum mold plates, were also found to be the same (within about ± 1°–2°C.) for the respective thermoformable materials when the mold plates were also made of other metals such as steel and brass, and the other conditions were the same.

Subsequent to the initial trial-and-error procedures that were used, as described above, to determine the above reported minimum Ta values for the various listed thermoformable materials, a more rigorous experimental approach was used to ascertain the minimum Ta values for such thermoformable materials. In this procedure an Instron Tensile Strength Tester was used to evaluate each thermoformable material to ascertain its minimum Ta values. The Instron instrument comprised a heated set of metal discs of known cross-sectional areas (0.994 in$^2$) which were thermostatically controlled and housed in a sealable chamber having pyrex windows in the walls thereof for observation purposes. A 100 mil thick disc sample (0.994 in$^2$) of the thermoformable material was then inserted between the metal discs which were heated near the previously (empirically) determined Ta value for such material. The instrument was then subjected to a compressive load of 2 psi for 5 seconds to allow the thermoformable material to be fused by the metal discs and to wet the discs with such material. The instrument was then subjected to a tensile loading at a crosshead speed of 2 inches per minute to determine the minimum temperature at which the thermoformable material was fluid enough to be pulled apart while still adhering to the discs. The tensile loadings required to accomplish this vary from thermoformable material to thermoformable material but were in the range of about 6 to 10 psi of tensile force for the synthetic resins whose (minimum) Ta values are reported above.

It was found that the minimum Ta values, when the thermoformable materials were tested in the Instron tensile tester as noted above, were within ± 1°–2°C. of the minimum Ta values which had been previously found for such materials in the initial trial-and-error procedures. These minimum Ta values were also within about ± 1°–2°C. for each of such thermoformable materials regardless of whether the metal used in the metal discs of the Instron tensile tester was aluminum, cold rolled steel, hot rolled steel, zinc plated steel or brass. The same results are also obtained when the metal disc was coated with a baked on coating of a dispersion grade of polytetrafluoroethylene. Polytetrafluoroethylene is not useful, however, as a thermoformable material in the process of the present invention since it does not melt with a useful Ta value.

These test results thus provide the basis for the Ta values reported above for each of the listed thermoformable materials. These reported Ta values, however, are the minimum temperatures at which the related thermoformable materials can be employed in the process of the present invention. The useful range of Ta values for a particular thermoformable material, with respect to its utility in the process of the present invention, will vary from thermoformable material to thermoformable material. Each thermoformable material has its own peculiar viscosity properties at elevated temperatures i.e., above its minimum Ta value. To be useful in the process of the present invention, at temperatures above its minimum Ta, the thermoformable material must be viscous enough to withstand the force of gravity and not sag between the mold plates during the separation of the mold plates. The useful range of Ta values, therefore, is that wherein the thermoformable material retains its adhesion to the mold plates and at which its melt viscosity is low enough to afford melt flow or extensibility, but at which it is not so fluid, or have such a low degree of viscosity, as to sag under the influence of the forces of gravity. Every material that can be melted usually becomes more fluid, or less viscous, as the temperature of the melt is increased. To be useful in the process of the present invention the thermoformable material cannot be heated so high above its minimum Ta value as to become so fluid in its expanded condition that it has more tendency to sag during the molding cycle under the influence of gravity than to retain its expanded configuration.

As a practical matter as the blank is separated between the hot mold plates, those portions of the expanded blank that are in the cross-section of the expanded blank, and are not in direct contact with the heated mold plates, tend to cool faster and become more viscous, than those portions of the blank that remain in contact with the mold plates.

In the case of crystalline thermoformable materials the useful range of Ta values is relatively narrow, and, in the case of some such materials the useful range of Ta values may only be 5° to 10°C. above the Tm of such materials. In the case of amorphous thermoformable materials the useful range of Ta values is usually broader.

It is to be noted also, that, in the case of polymeric thermoformable materials, the Ta values of polymeric materials made from the same monomers will vary depending on the molecular weight of the polymer. The Ta values for such polymers will usually be proportionally higher as the molecular weight of the polymer is increased.

The speed with which the blank of the thermoformable material can be expanded between the mold plates within the useful range of Ta values will also depend on several factors such as the viscosity of the thermoformable material at the Ta value employed, the mass and shape of the thermoformable material, the amount of area of contct between the surface of the mold plates and the surfaces of the blank, and the complexity of the cross-sectional geometry of the expanded article.

What is claimed is:

1. A process for expanding the cross section of a blank of thermoformable material between a pair of perforation means while said blank is in a thermoformable state, each of said perforation means providing perforations adjacent the interface of contact between said perforation means and said blank, and the perforations in one perforation means being non-aligned with the perforations in the other perforation means, said expanding being attended by the formation of one or more voids having a partial vacuum therein within the cross section of the expanding blank, the pattern of occurrence of such voids being in response to the pattern of perforations in said perforation means, which comprises venting said voids during said expanding so as to equilibrate the lower level of pressure within said voids with the higher level of ambient pressure without said blank and thereby regulate the uniformity and integrity of the resulting cross-sectional geometry of the expanded blank.

2. A process as in claim 1 in which the expansion of the cross section of the thermoformable material is accomplished by pulling the blank, while in said thermoformable state, between a pair of perforated mold plates as said perforation means.

3. A process as in claim 2 in which said blank is adhesively bonded to said mold plates during said pulling at the non-perforated areas of the perforated surfaces of the mold plates.

4. A process as in claim 3 in which said blank is adhesively bonded to said mold plates as a result of hot tack adhesion between said blank and the non-perforated surfaces of said mold plates.

5. A process as in claim 4 in which said blank comprises thermoplastic material.

6. A process as in claim 5 in which said thermoplastic material comprises synthetic resin.

7. A process as in claim 4 in which said blank comprises thermosetting resin.

8. A process for expanding the cross section of a material having a Ta between a pair of perforated mold plates while said material is in a thermoformable state so as to provide a product having an expanded cross-sectional geometry which comprises
positioning said material between said mold plates while said material is heated to a temperature which is ≥ the Ta of said material,
the perforations in each of said mold plates being non-aligned with the perforations in the other mold plate,
adhesively bonding said material by hot tack adhesion to each of said mold plates at the non-perforated portions of the perforated surfaces of said mold plates,
pulling said mold plates apart, while said material is so adhesively bonded thereto and is in said thermoformable state, so as to expand the cross section of said material and thereby effect within said material one or more voids having a partial vacuum therein,
venting said voids during said pulling apart so as to equilibrate the lower level of pressure within said voids with the higher level of ambient pressure without said material and thereby preserve the pattern and the integrity of the voids in the resulting cross-sectional geometry, and
cooling the expanded material to a temperature below the heat distortion point of said material.

9. A process as in claim 8 further comprising the separation of at least one of said mold plates from the cooled expanded material.

10. A process as in claim 8 in which each of the perforations in each of the mold plates overlaps at least one of the perforations in the other mold plate.

11. A process as in claim 10 in which the resulting cross-sectional geometry in the expanded material is a function of the pattern of said adhesion bonding.

12. A process as in claim 11 in which the perforations are all arcuate.

13. A process as in claim 11 in which the perforations are all angular.

14. A process as in claim 8 in which said venting is accomplished through said mold plates.

15. A process for expanding, between a pair of perforated mold plates, the cross section of a blank of material having a Ta while said blank is in a thermoformable state so as to provide the material with an expanded cross sectional geometry, which expanded geometry comprises a plurality of cells separated by expanded ribs of said material, and wherein the surface of each of said perforated mold plates has a non-perforated contacting surface area and said blank has two contacting surfaces,
said process comprising
positioning said mold plates with respect to each other so that the perforations therein are not aligned,
positioning said blank between the surfaces of said mold plates while said blank is heated to a temperature which is ≥ said Ta,
bringing said mold plates and said blank into contact at the contacting surfaces thereof while said blank is at a temperature of ≥ Ta so as to effect hot tack adhesion between said contacting surfaces,
expanding the distance between said mold plates with said blank thus adhesively bonded thereto and while said blank is in said thermoformable state so as to effect an expansion of the cross-section of said blank with the attendant formation within said expaned cross-section of a plurality of cells separated by expanded ribs of the material in said blank,
said cells encompassing areas having a partial vacuum therein, and the configuration of each, and of the combination of all, of said cells being in response to the pattern of contact between all of the contacting surfaces,
venting said cells during said expansion so as to equilibrate the lower level of pressure within said cells with the higher level of ambient pressure without said blank and thereby maintain the uniformity and integrity of the configuration of the resulting cross sectional geometry, and
cooling the expanded blank to a temperature below the heat distortion of said material.

16. A process as in claim 15 in which each of the perforations in each of the mold plates overlaps at least one of the perforations in the other mold plate.

17. A process as in claim 16 in which all of the perforations are arcuate.

18. A process as in claim 16 in which all of the perforations are angular.

19. A process as in claim 15 in which said venting is accomplished through said mold plates.

20. A process as in claim 15 in which said blank is a sheet of said material having a Ta.

21. A process as in claim 15 in which the cross section of said blank is expanded ≥ 2 to 20 times the pre-expansion thickness of said blank.

22. A process as in claim 1 in which said perforation means is masking means.

* * * * *

UNITED STATES PATENT OFFICE
CERTIFICATE OF CORRECTION

Patent No. 3,919,382                    Dated November 11, 1975

Inventor(s) Walter H. Smarook                    Page 1 of 4

It is certified that error appears in the above-identified patent and that said Letters Patent are hereby corrected as shown below:

Column 2, line 19, "form" should read --from--.

Column 5, line 19, "FIg" should read --FIG--.

Column 5, line 30, "of Tm of the thermpolastic" should read --or Tm of the thermoplastic--.

Column 5, line 65, "curing" should read -curring--.

Column 6, line 25, "desireed" should read --desired--.

Column 7, line 2, "top plate" should read --top mold plate--.

Column 7, line 19, "perforations" should read --perforation--.

Column 8, line 19, "a", first occurrence, should be deleted.

Column 8, line 31, "a" should be deleted.

Column 8, line 46, "expaned" should read --expanded--.

Column 11, line 2, "5a" should read --5A--.

Column 11, last line, "aroung" should read --around--.

Column 12, line 32, "thhrough" should read --through--.

Column 13, line 12, "expaned" should read --expanded--.

UNITED STATES PATENT OFFICE
CERTIFICATE OF CORRECTION

Patent No. 3,919,382    Dated November 11, 1975

Inventor(s) Walter H. Smarook    Page 2 of 4

It is certified that error appears in the above-identified patent and that said Letters Patent are hereby corrected as shown below:

Column 15, line 33, "perforetions" should read --perforations--.

Column 18, line 48, "aroung" should read --around--.

Column 19, line 21, "shdown" should read --shown--.

Column 19, line 38, "than" should read --then--.

Column 21, line 27, "th" should read --the--.

Column 21, line 57, "one one" should read --on one--.

Column 22, line 62, "inter poly" should read --interpoly--.

Column 24, line 25, "acids" should read --aids--.

Column 24, line 42, "stablizers" should read --stabilizers--.

Column 25, line 3, "puled" should read --pulled--.

Column 25, line 30, "dould" should read --could--.

Column 25, line 57, "promotors" should read --promoters--.

Column 26, line 6, "of" should read --or--.

Column 26, line 22, "isocycnatopropyl" should read --isocyanatopropyl--.

UNITED STATES PATENT OFFICE
CERTIFICATE OF CORRECTION

Patent No. 3,919,382      Dated November 11, 1975

Inventor(s) Walter H. Smarook      Page 3 of 4

It is certified that error appears in the above-identified patent and that said Letters Patent are hereby corrected as shown below:

Column 26, line 65 "6 x 6" should read -- 6" x 6" --.

Column 27, line 11, "holed" should read -- holes --.

At each of column 29, line 68, column 30, lines 9 and 39, column 31, line 39, column 32, line 36 column 33, lines 1-2 and 59-60, column 34, line 59, column 35, line 8,

"6 x 6 inch" should read -- 6 inches x 6 inches --.

Column 33, line 8, "1/2 x 1/2 inch" should read -- 1/2 inch x 1/2 inch --.

Column 33, last line, "," should read -- . --.

Column 35, line 28, "polyvinly" should read -- polyvinyl --.

Column 35, lines 37-39, "U.S. patent application Ser. No. 213,432 filed Dec. 29, 1971 in the names of Walter H. Smarook and John Sonia and now abandoned." should read -- U. S. patent

UNITED STATES PATENT OFFICE
CERTIFICATE OF CORRECTION

Patent No. 3,919,382                    Dated November 11, 1975

Inventor(s) Walter H. Smarook                    Page 4 of 4

It is certified that error appears in the above-identified patent and that said Letters Patent are hereby corrected as shown below:

application Serial No. 427,480, filed Dec. 26, 1973, now Patent No. 3,919,380 which is a continuation-in-part of application Serial No. 213,432, filed Dec. 29, 1971 in the names of Walter H. Smarook and John Sonia and now abandoned --;

Column 36, lines 59-60, "6 x 6 inches" should read -- 6 inches x 6 inches --.

Column 36, line 61, "6 x 6" should read -- 6 inches x 6 inches --

Column 37, line 1, "j" should be deleted.

Column 38, line 39, "contct" should read -- contact --.

Column 40, line 48, after "distortion" insert -- point --.

Under "Other Publication" the editor's name "Birich" should read -- Eirich --.

Signed and Sealed this

Twenty-second Day of February 1977

[SEAL]

Attest:

RUTH C. MASON
*Attesting Officer*

C. MARSHALL DANN
*Commissioner of Patents and Trademarks*